(12) United States Patent
Inoue et al.

(10) Patent No.: US 7,987,038 B2
(45) Date of Patent: Jul. 26, 2011

(54) CRUISE CONTROL

(75) Inventors: Takuya Inoue, Sagamihara (JP);
Yoshinori Yamamura, Yokohama (JP);
Hidekazu Nakajima, Yokohama (JP);
Yoshitaka Uemura, Kawasaki (JP);
Koki Minegishi, Yokosuka (JP); Yoji Seto, Yokohama (JP); Masahide Nakamura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 558 days.

(21) Appl. No.: 11/856,907

(22) Filed: Sep. 18, 2007

(65) Prior Publication Data
US 2008/0078600 A1 Apr. 3, 2008

(30) Foreign Application Priority Data

Sep. 29, 2006 (JP) .................................. 2006-267701
Sep. 29, 2006 (JP) .................................. 2006-267702
Jul. 10, 2007 (JP) .................................. 2007-180989

(51) Int. Cl.
*B60T 7/12* (2006.01)
*G08G 1/16* (2006.01)

(52) U.S. Cl. ........................... 701/96; 701/301; 340/903

(58) Field of Classification Search .............. 701/83–85, 701/92–93, 96–98, 103–107, 110, 119, 124, 701/200–226, 301; 340/901–904, 917, 932, 340/936–938, 995.2–995.27, 463, 466–467
See application file for complete search history.

(56) References Cited

U.S. PATENT DOCUMENTS

| 5,805,103 | A | * | 9/1998 | Doi et al. ...................... 342/70 |
| 2004/0117090 | A1 | * | 6/2004 | Samukawa et al. ............. 701/45 |
| 2004/0167702 | A1 | * | 8/2004 | Isogai et al. .................... 701/96 |
| 2005/0182551 | A1 | * | 8/2005 | Sugano ........................... 701/96 |
| 2005/0218718 | A1 | * | 10/2005 | Iwatsuki et al. ............... 303/177 |
| 2005/0225477 | A1 | * | 10/2005 | Cong et al. ...................... 342/70 |
| 2005/0236895 | A1 | * | 10/2005 | Matsumoto et al. .......... 303/140 |
| 2006/0025918 | A1 | * | 2/2006 | Saeki ............................... 701/96 |
| 2006/0289216 | A1 | * | 12/2006 | Kato ............................... 180/169 |

FOREIGN PATENT DOCUMENTS

| JP | 10269498 | * | 10/1998 |
| JP | 2002-123898 A | | 4/2002 |
| WO | WO2005062984 | * | 7/2005 |

* cited by examiner

*Primary Examiner* — James Trammell
*Assistant Examiner* — Muhammad Shafi
(74) *Attorney, Agent, or Firm* — Young Basile

(57) ABSTRACT

A cruise control for a vehicle that detects an inter-vehicle distance to a preceding vehicle. A first vehicle speed instruction value is computed based on the inter-vehicle distance. Curve information of a curve in the road ahead of the vehicle is detected, and a second vehicle speed instruction value is computed for traveling on the curve based on the curve information. A final target vehicle speed is set based on the vehicle speed instruction values. When the vehicle travels through the curve while the first vehicle speed instruction value is larger than the second vehicle speed instruction value, the final target vehicle speed is set to a vehicle speed higher than the second vehicle speed instruction value and lower than the first vehicle speed instruction value. The speed of the vehicle is controlled based on the final target vehicle speed.

20 Claims, 16 Drawing Sheets

CRUISE CONTROL

CROSS-REFERENCE TO RELATED APPLICATIONS

This application claims priority from Japanese Patent Application Serial No. 2006-267701, filed Sep. 29, 2006, Japanese Patent Application Serial No. 2006-267702, filed on Sep. 29, 2006, and Japanese Patent Application Serial No. 2007-180989, filed on Jul. 10, 2007, each of which is incorporated herein in its entirety by reference.

TECHNICAL FIELD

The present invention pertains to cruise control technology for a vehicle.

BACKGROUND

There are known cruise control systems including a vehicle controller that controls vehicle speed on the basis of road information obtained from a navigation device and on the inter-vehicle distance to a preceding vehicle so that a vehicle can travel on the curve ahead at an appropriate speed. One such system is taught in Japanese Kokai Patent Application No. 2002-123898. In that vehicle controller, when there is a preceding vehicle, the target vehicle speed determined by the vehicle speed controller for traveling on the upcoming curve at an appropriate speed and the target vehicle speed determined by the vehicle speed controller corresponding to the inter-vehicle distance to the preceding vehicle are compared. The lower target vehicle speed is used as the speed instruction value sent to the actuator.

SUMMARY

Disclosed herein is a cruise control system that provides an improved feel for a driver of a vehicle following a preceding vehicle. The vehicle can include a preceding vehicle detector that detects an inter-vehicle distance to the preceding vehicle and a curve detector that detects curve information of a curve ahead of the vehicle. One example of such a cruise control as taught herein comprises a first vehicle speed instruction value computing part is adapted to compute a first vehicle speed instruction value based on the inter-vehicle distance, and a second vehicle speed instruction value computing part is adapted to compute a second vehicle speed instruction value for traveling on the curve based on the curve information. A target vehicle speed setting part is adapted to set a final target vehicle speed higher than the second vehicle speed instruction value and lower than the first vehicle speed instruction value when the vehicle travels on the curve and while the first vehicle speed instruction value is larger than the second vehicle speed instruction value. A speed control part is adapted to control a vehicle speed based on the final target vehicle speed.

Another cruise control taught herein for such a vehicle comprises first computing means for computing a first vehicle speed instruction value based on the inter-vehicle distance, second computing means for computing a second vehicle speed instruction value for traveling on the curve, the second vehicle speed instruction value based on the curve information, target setting means for setting a final target vehicle speed higher than the second vehicle speed instruction value and lower than the first vehicle speed instruction value when the vehicle travels over the curve and while the first vehicle speed instruction value is larger than the second vehicle speed instruction value and speed controlling means for controlling the vehicle speed based on the final target vehicle speed.

Cruise control methods for a vehicle following a preceding vehicle are also taught herein. The vehicle can include a preceding vehicle detector that detects an inter-vehicle distance to a preceding vehicle and a curve detector that detects curve information of a curve ahead of the vehicle. One method taught herein comprises setting a first vehicle speed instruction value based on the inter-vehicle distance, setting a second vehicle speed instruction value for traveling on the curve based on the curve information and setting a final target vehicle speed as a vehicle speed higher than the second vehicle speed instruction value and lower than the first vehicle speed instruction value for at least a portion of the curve when the vehicle travels on the curve and while the first vehicle speed instruction value is larger than the second vehicle speed instruction value.

BRIEF DESCRIPTION OF THE DRAWINGS

The description herein makes reference to the accompanying drawings wherein like reference numerals refer to like parts through the several views, and wherein.

DETAILED DESCRIPTION OF EMBODIMENTS OF THE INVENTION

According to Japanese Kokai Patent Application No. 2002-123898, when the target vehicle speed determined by the vehicle speed controller for traveling on the upcoming curve at an appropriate speed is lower than the target vehicle speed determined by the vehicle speed controller corresponding to the inter-vehicle distance to the preceding vehicle, and this difference increases, the driver can feel like he is lagging behind the preceding vehicle. As a result, the driver may be prompted to step on the accelerator pedal or perform another operation, which bothers the driver.

In contrast, a cruise control according to the disclosure detects a vehicle speed and an inter-vehicle distance to the preceding vehicle. A first vehicle speed instruction value is computed such that the inter-vehicle distance becomes the prescribed target inter-vehicle distance. Curve information of the road ahead of the own vehicle is detected, and a second vehicle speed instruction value for traveling on the curve on the basis of the curve state is computed. The final target vehicle speed is set based on these vehicle speed instruction values. When the vehicle travels on the curve while the first vehicle speed instruction value is higher than the second vehicle speed instruction value, the final target vehicle speed can be set higher than the second vehicle speed instruction value and lower than the first vehicle speed instruction value. The vehicle speed is controlled based on the final target vehicle speed. Accordingly, when the vehicle travels on the curve while the first vehicle speed instruction value is larger than the second vehicle speed instruction value, the final target vehicle speed can be set higher than the second vehicle speed instruction value and lower than the first vehicle speed instruction value so that the feeling of lagging behind the preceding vehicle can be alleviated during deceleration of the vehicle on the curve.

Figure 1:
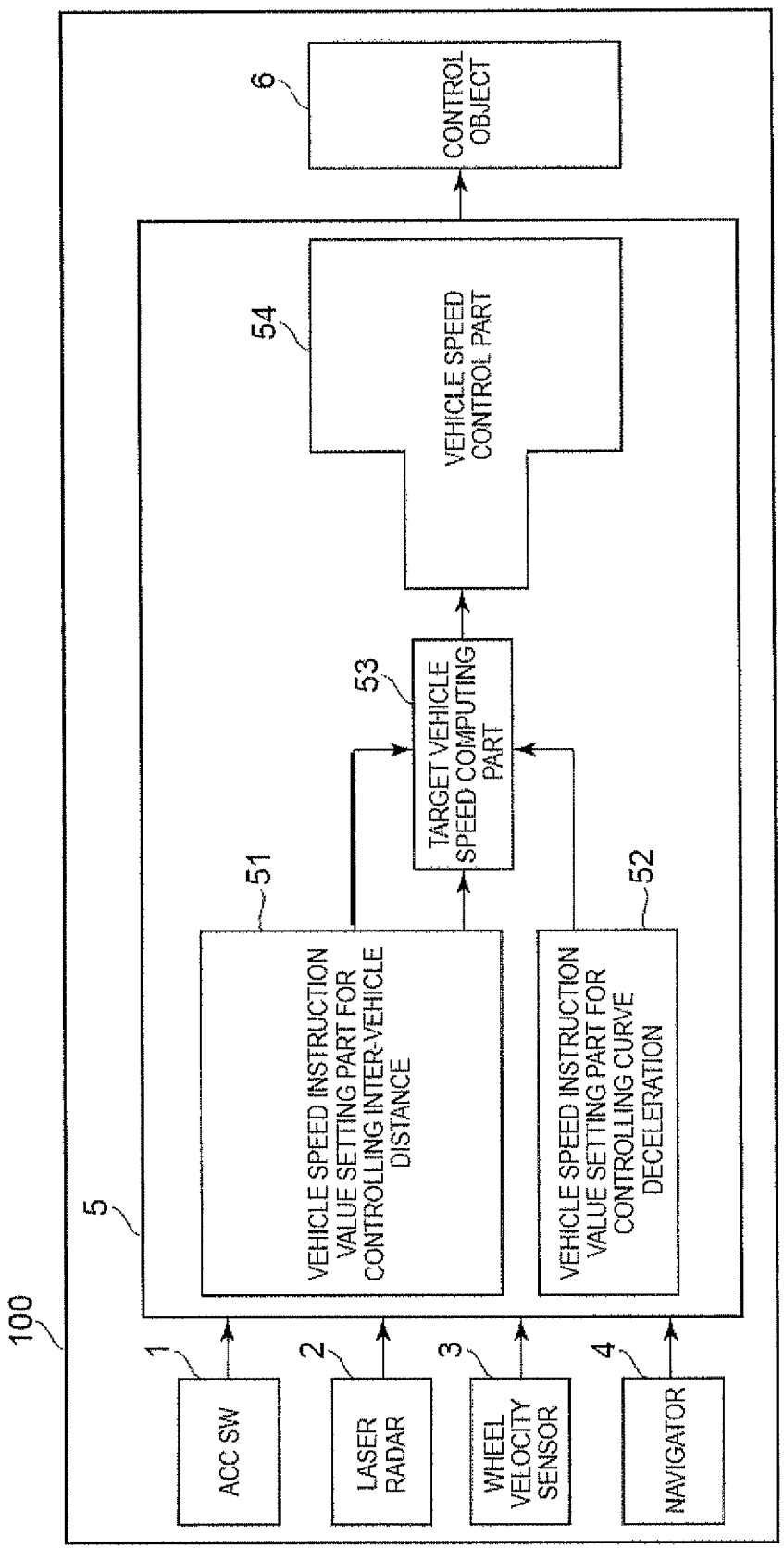
FIG. 1 is a diagram illustrating the overall constitution of a vehicle with a vehicle cruise control according to the teachings herein.

In the following, an explanation is given regarding this first embodiment of the vehicle cruise control with reference to FIGS. 1-8. FIG. 1 shows a vehicle 100 including ACC switch 1, laser radar 2, wheel velocity sensor 3, navigator 4, cruise control 5 and control object 6. ACC switch 1 is a switch used by the driver to input various commands pertaining to the control of the inter-vehicle distance to be explained below.

Laser radar 2 is attached to the front grille, bumper, etc., of vehicle 100, for example. Laser radar 2 emits a laser beam ahead of the vehicle, and it receives the light reflected from the preceding vehicle (such as a car) present ahead of the vehicle so that it can detect the presence/absence of the preceding vehicle, an inter-vehicle distance L to the preceding vehicle, and the relative speed (difference in vehicle speed) Vd. Wheel velocity sensor 3 detects wheel velocity Vw of vehicle 100.

Navigator 4 is a device for surveying the path and guiding the driver on the path. Navigator 4 has a Global Positioning System (GPS) receiver for detecting the vehicle's position information (X, Y), and a storage medium for storing map information. The storage medium holds the node point information indicating the coordinates of the node points set on the travel path. Here, the node points are points indicating the travel path on which the vehicle can travel. That is, the node string on which the node points are set side by side indicates the linear or curved travel path on which the vehicle travels.

Cruise control 5 is a device that performs inter-vehicle distance control and curve deceleration control and outputs these control signals to control object 6. It includes vehicle speed instruction value setting part for controlling inter-vehicle distance 51 (first speed instruction value computing part), vehicle speed instruction value setting part for controlling curve deceleration 52 (second speed instruction value computing part), target vehicle speed computing part 53 (target vehicle speed setting part) and vehicle speed controller 54. In regard to inter-vehicle distance control, when a preceding vehicle is recognized, the inter-vehicle distance is controlled so that the inter-vehicle distance to the preceding vehicle becomes the target value. On the other hand, when no preceding vehicle is recognized, the vehicle speed is controlled so that vehicle speed V becomes the preset vehicle speed (hereinafter to be referred to as preset vehicle speed). In regard to curve deceleration control, vehicle speed V is controlled to an appropriate speed to adapt to the contours of the curve ahead. Details of the various parts of cruise control 5 and the control contents of cruise control 5 are discussed below.

Cruise control 5 generally consists of a microcomputer including a central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The functional parts of the cruise control 5 described herein could be, for example, implemented in software as the executable programs, or could be implemented in whole or in part by separate hardware in the form of one or more integrated circuits (IC). Accordingly, the cruise control 5 can be a standard engine control unit (ECU) programmed with the algorithms described herein.

Control object 6 is the device for performing acceleration/deceleration of vehicle 100. As will be explained below, it has an engine torque actuator and a brake hydraulic pressure actuator. These devices on vehicle 100 are the same as those equipped in conventional vehicles.

Figure 2:
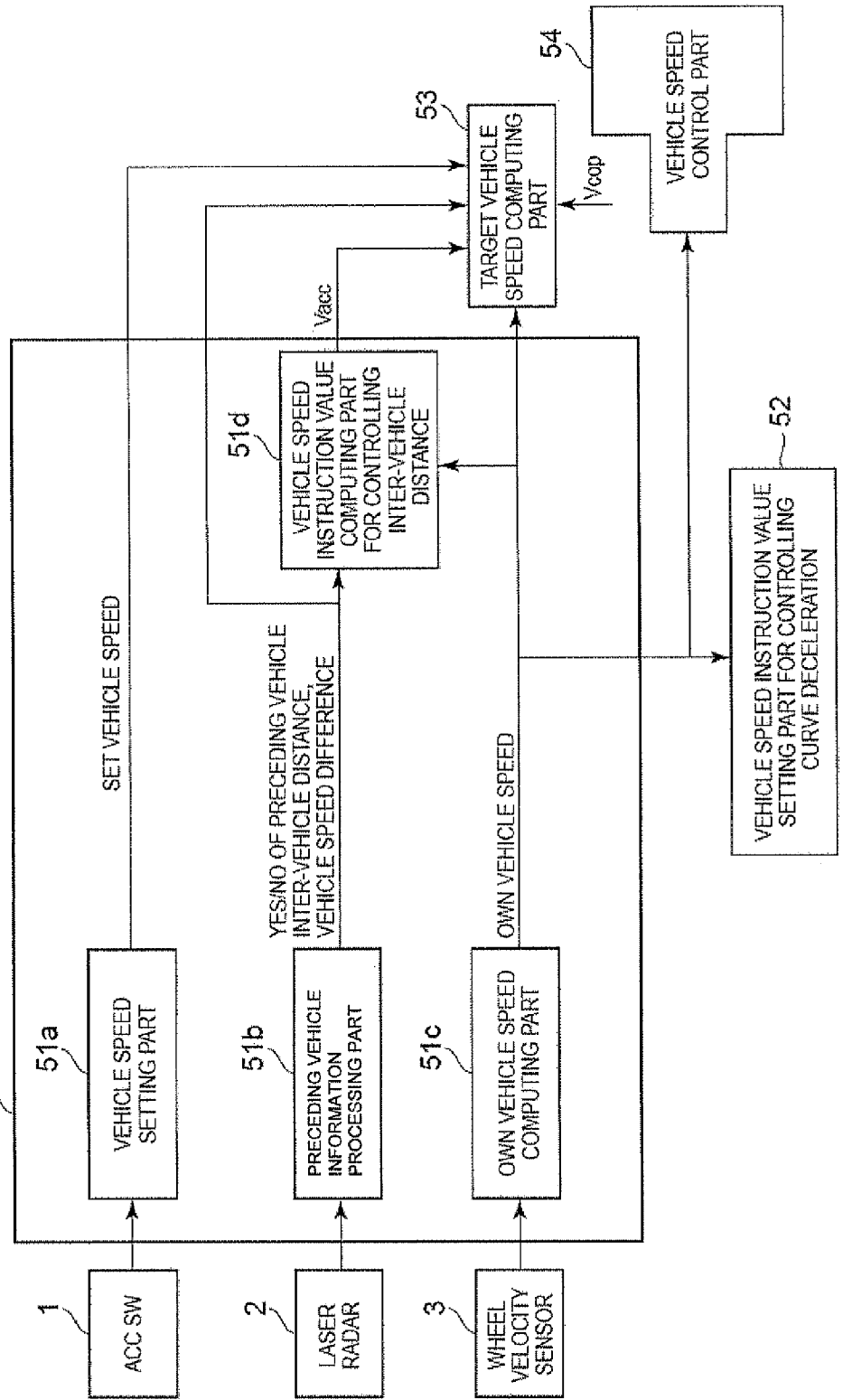
FIG. 2 is a diagram illustrating in detail a vehicle speed instruction value setting part for controlling inter-vehicle distance according to FIG. 1.

FIG. 2 is a diagram illustrating in detail vehicle speed instruction value setting part for controlling inter-vehicle distance 51. Vehicle speed instruction value setting part for controlling inter-vehicle distance 51 has vehicle speed setting part 51a, preceding vehicle information processing part 51b, own vehicle speed computing part 51c and vehicle speed instruction value computing part for controlling inter-vehicle distance 51d. Vehicle speed setting part 51a outputs the preset vehicle speed set by the driver as preset vehicle speed instruction value Vset to target vehicle speed computing part 53 based on the output signal from ACC switch 1. Preceding vehicle information processing part 51b reads the state of the preceding vehicle, that is, the presence/absence of a preceding vehicle, inter-vehicle distance L and vehicle speed difference Vd, and outputs them to vehicle speed instruction value computing part for controlling inter-vehicle distance 51d and target vehicle speed computing part 53 based on the signal from laser radar 2.

The target value of the inter-vehicle distance to the preceding vehicle in the inter-vehicle distance control can be set to, e.g., the three distances "long," "intermediate" or "short," by means of the operation of ACC switch 1. If the inter-vehicle distance is set as "long," the inter-vehicle distance to the preceding vehicle is kept long; if the inter-vehicle distance is set as "intermediate," the inter-vehicle distance to the preceding vehicle is kept intermediate; and, if the inter-vehicle distance is set as "short," the inter-vehicle distance to the preceding vehicle is kept short. Typical ranges for these distance designations are known to those skilled in the art.

Also, the control mode for inter-vehicle distance control can be set to, e.g., "normal mode," "sports mode," etc., by means of operation of ACC switch 1. When the control mode is set to "normal mode," in the control of the inter-vehicle distance to the preceding vehicle, the acceleration/deceleration limit value and control gain are set as the acceleration/deceleration limit value and control gain in the normal state. When the control mode is set to "sports mode," the acceleration/deceleration limit value is changed to a larger absolute value than that of the acceleration/deceleration limit value of the "normal mode," and a higher acceleration/deceleration is realized. The control gain is also changed to a value larger than the control gain for "normal mode," so that it is possible to be more responsive to the preceding vehicle by quickly following the changes in the speed of the preceding vehicle. Other modes are known to those skilled in the art.

Own vehicle speed computing part 51c computes vehicle speed V of vehicle 100 based on the signal output from wheel velocity sensor 3 and outputs it to vehicle speed instruction value computing part for controlling inter-vehicle distance 51d, vehicle speed instruction value setting part for controlling curve deceleration 52 and target vehicle speed computing part 53. Vehicle speed instruction value computing part for controlling inter-vehicle distance 51d computes a vehicle speed instruction value for controlling inter-vehicle distance Vacc and outputs it to target vehicle speed computing part 53 based on vehicle speed V computed by own vehicle speed computing part 51c.

Figure 3:
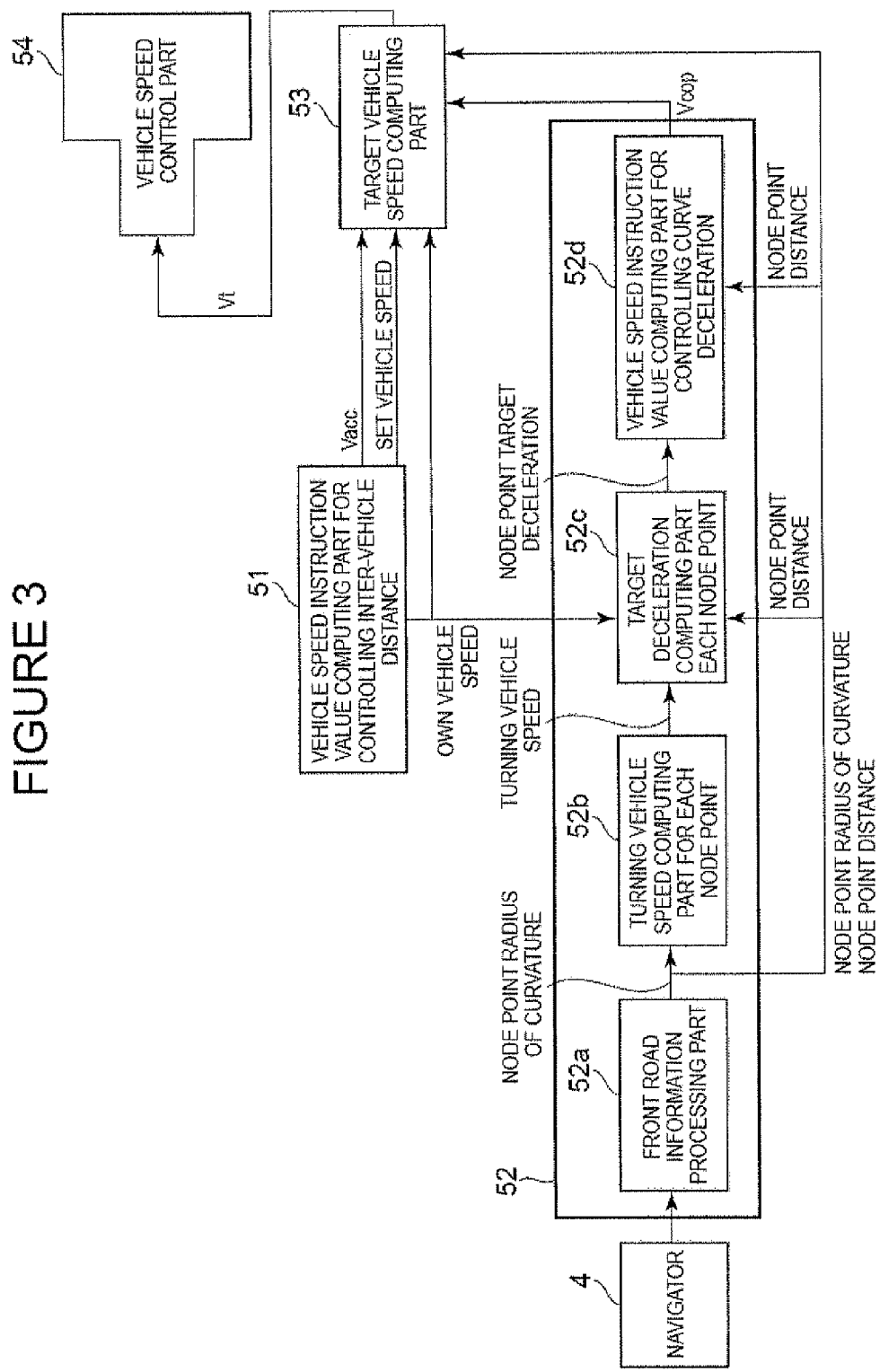
FIG. 3 is a diagram illustrating details of a vehicle speed instruction value setting part for controlling curve deceleration and a target vehicle speed computing part according to FIG. 1.

FIG. 3 is a diagram illustrating details of vehicle speed instruction value setting part for controlling curve deceleration 52 and target vehicle speed computing part 53. Vehicle speed instruction value setting part for controlling curve deceleration 52 includes road-ahead information processing part 52a, turning vehicle speed computing part for each node point 52b, target deceleration computing part for each node point 52c and vehicle speed instruction value computing part for controlling curve deceleration 52d. Road-ahead information processing part 52a reads the position information of vehicle 100 obtained from navigator 4 and the coordinates of each node point and the distance to each node point on the road ahead of the vehicle's position. Road-ahead information processing part 52a computes the radius of curvature of the road at each node point and outputs it to turning vehicle speed computing part for each node point 52b and target vehicle speed computing part 53, and, at the same time, it outputs the distance to each node point to target deceleration computing part for each node point 52c, vehicle speed instruction value computing part for controlling curve deceleration 52d and target vehicle speed computing part 53.

Turning vehicle speed computing part at each node point 52b computes the turning vehicle speed at each node point for turning with a prescribed lateral acceleration at each node point and outputs this information to target deceleration computing part for each node point 52c. Target deceleration computing part for each node point 52c computes the target deceleration for each node point and outputs this information to vehicle speed instruction value computing part for controlling curve deceleration 52d based on vehicle speed V obtained from vehicle speed instruction value setting part for controlling inter-vehicle distance 51, the distance to each node point obtained from road-ahead information processing part 52a and the turning vehicle speed for each node point computed by turning vehicle speed computing part at each node point 52b.

Vehicle speed instruction value computing part for controlling curve deceleration 52d selects as the target node point the node point where the computed deceleration is highest from the target decelerations for the various node points computed by target deceleration computing part for each node point 52c. Then, based on the distance to each node point obtained from road-ahead information processing part 52a, vehicle speed instruction value computing part for controlling curve deceleration 52d computes vehicle speed instruction value for controlling curve deceleration Vcop for computing the turning vehicle speed of a respective node point by turning vehicle speed computing part at each node point 52b when the target node point is reached. Vehicle speed instruction value computing part for controlling curve deceleration 52d outputs Vcop to target vehicle speed computing part 53.

On the basis of the computed values and instruction values, etc., obtained from the various parts described, target vehicle speed computing part 53 outputs target vehicle speed Vt to vehicle speed controller 54.

Figure 4:
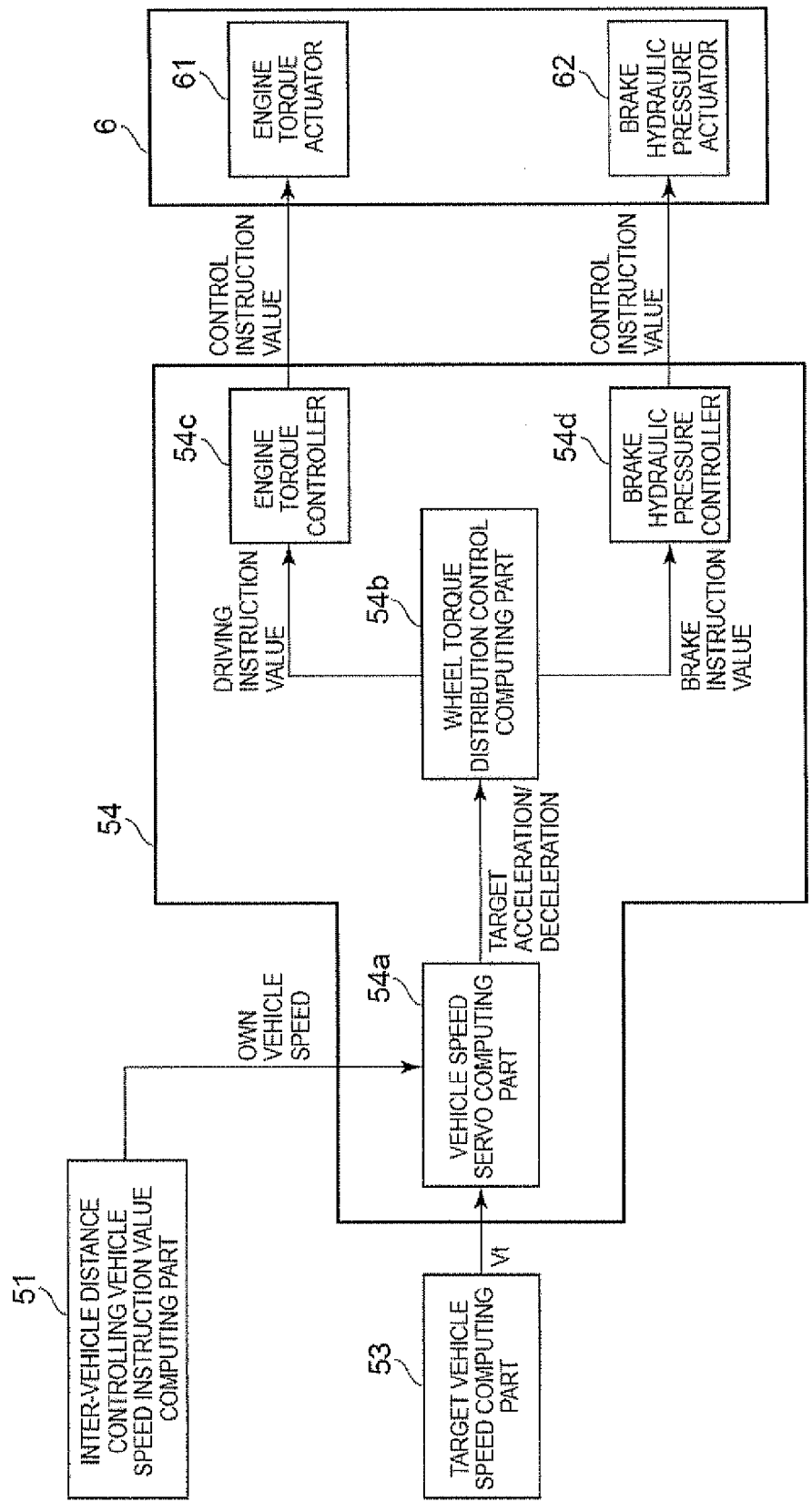
FIG. 4 is a diagram illustrating in detail a vehicle speed controller and a control object according to FIG. 1.

FIG. 4 is a diagram illustrating in detail vehicle speed controller 54 and control object 6. Vehicle speed controller 54 includes vehicle speed servo computing part 54a, wheel torque distribution control computing part 54b, engine torque controller 54c and brake hydraulic pressure controller 54d. Vehicle speed servo computing part 54a computes the target deceleration or target acceleration (hereinafter to be referred to as target acceleration/deceleration) and outputs it to wheel torque distribution control computing part 54b so that vehicle speed V becomes target vehicle speed Vt computed by target vehicle speed computing part 53.

Wheel torque distribution control computing part 54b computes the necessary engine torque and brake torque from the target acceleration/deceleration computed by vehicle speed servo computing part 54a. Wheel torque distribution control computing part 54b then outputs the corresponding driving instruction value and brake instruction value to engine torque controller 54c or brake hydraulic pressure controller 54d. Based on the driving instruction value computed by wheel torque distribution control computing part 54b, engine torque controller 54c outputs the control instruction value to control object 6. Based on the brake instruction value computed by wheel torque distribution control computing part 54b, brake hydraulic pressure controller 54d computes the control instruction value and outputs it to control object 6.

Control object 6 includes engine torque actuator 61 and brake hydraulic pressure actuator 62. Engine torque actuator 61 is an actuator for controlling the driving torque of the driving wheels, such as a throttle valve or the like, and it changes the throttle openness on the basis of the driving instruction value output from engine torque controller 54c. As a result, the necessary engine torque required for obtaining the target acceleration/deceleration computed by vehicle speed servo computing part 54a can be obtained.

Brake hydraulic pressure actuator 62 is an actuator that is set between a master cylinder that generates the brake hydraulic pressure and the hydraulic cylinder (wheel cylinder) of the hydraulic pressure brake set on each wheel. Brake hydraulic pressure actuator 62 controls the hydraulic pressure of each wheel cylinder to any brake hydraulic pressure. Based on the brake instruction value output from brake hydraulic pressure controller 54d, brake hydraulic pressure actuator 62 controls the hydraulic pressure of the wheel cylinder. As a result, the necessary brake torque required for obtaining the target acceleration/deceleration computed by vehicle speed servo computing part 54a can be obtained. Since control object 6, that is, engine torque actuator 61 and brake hydraulic pressure actuator 62, is controlled on the basis of the instruction values output from vehicle speed controller 54, vehicle speed V is controlled to become target vehicle speed Vt.

Figure 5:
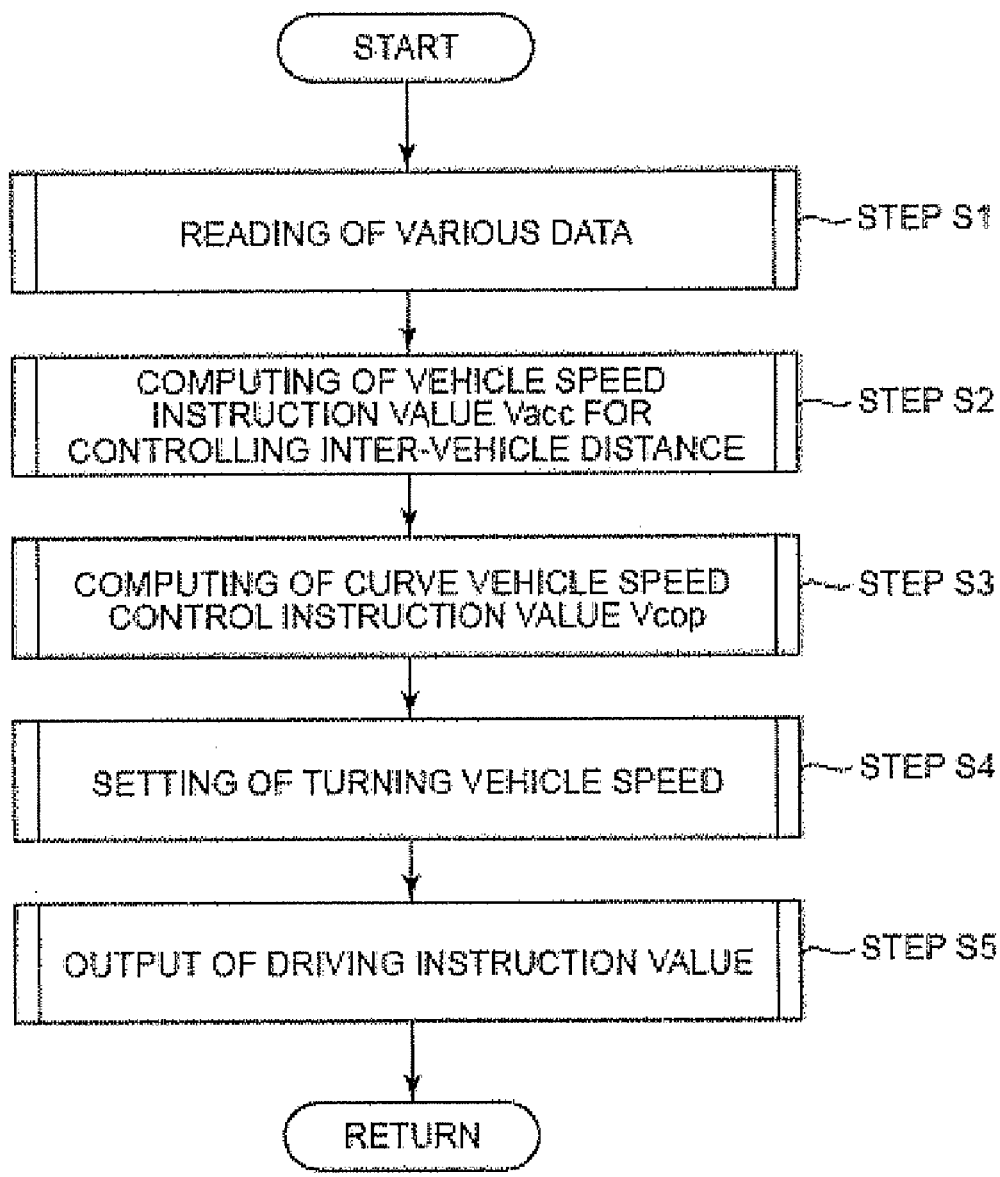
FIG. 5 is a flow chart illustrating the process for computing the driving instruction value to a control object according to FIG. 1.

FIG. 5 is a flow chart illustrating the process for computing the driving instruction value for controlling control object 6. The process shown in FIG. 5 is executed by cruise control 5 at each prescribed sampling time during the operation of vehicle 100. In step S1 the data are read from the various sensors, etc. More specifically, based on the operating signal from ACC switch 1, preset vehicle speed Vset and the setting state of the inter-vehicle distance set by the driver are read, and inter-vehicle distance L to the preceding vehicle is read from laser radar 2. Also, wheel velocity Vw is read from wheel velocity sensor 3. In addition, from navigator 4, position (X,Y) of the vehicle 100 and node point information ((X(n),Y(n),L(n)) of the road ahead of the vehicle 100 are read. After the data are read from the various sensors, process control goes to step S2.

Based on the data read from the various sensors in step S1, the vehicle speed instruction value, that is, inter-vehicle distance controlling vehicle speed instruction value Vacc (the vehicle speed instruction value for controlling inter-vehicle distances) is computed corresponding to the inter-vehicle distance in step S2. One specific computation method is explained below.

When it is judged that there is no preceding vehicle on the basis of inter-vehicle distance L read in step S1, preset vehicle speed Vset set by the driver and read in step S1 is used as inter-vehicle distance controlling vehicle speed instruction value Vacc. After inter-vehicle distance controlling vehicle speed instruction value Vacc is computed in step S2, process control goes to step S3.

In step S3 the vehicle speed instruction value corresponding to the curve ahead of the vehicle 100, that is, vehicle speed instruction value for controlling curve deceleration Vcop as the vehicle speed instruction value for controlling the vehicle speed on curves is computed on based on the data from the various sensors read in step S1. A method for computing vehicle speed instruction value for controlling curve deceleration Vcop is explained below. After vehicle speed instruction value for controlling curve deceleration Vcop is computed, process control goes to step S4.

In step S4 final target vehicle speed Vt is set based on inter-vehicle distance controlling vehicle speed instruction value Vacc and vehicle speed instruction value for controlling curve deceleration Vcop computed in step S3. Process control then goes to step S5.

In step S5 the driving instruction value is computed from target vehicle speed Vt set in step S4, the computed driving instruction value is output to control object 6, and then process control returns to start.

Figure 6:
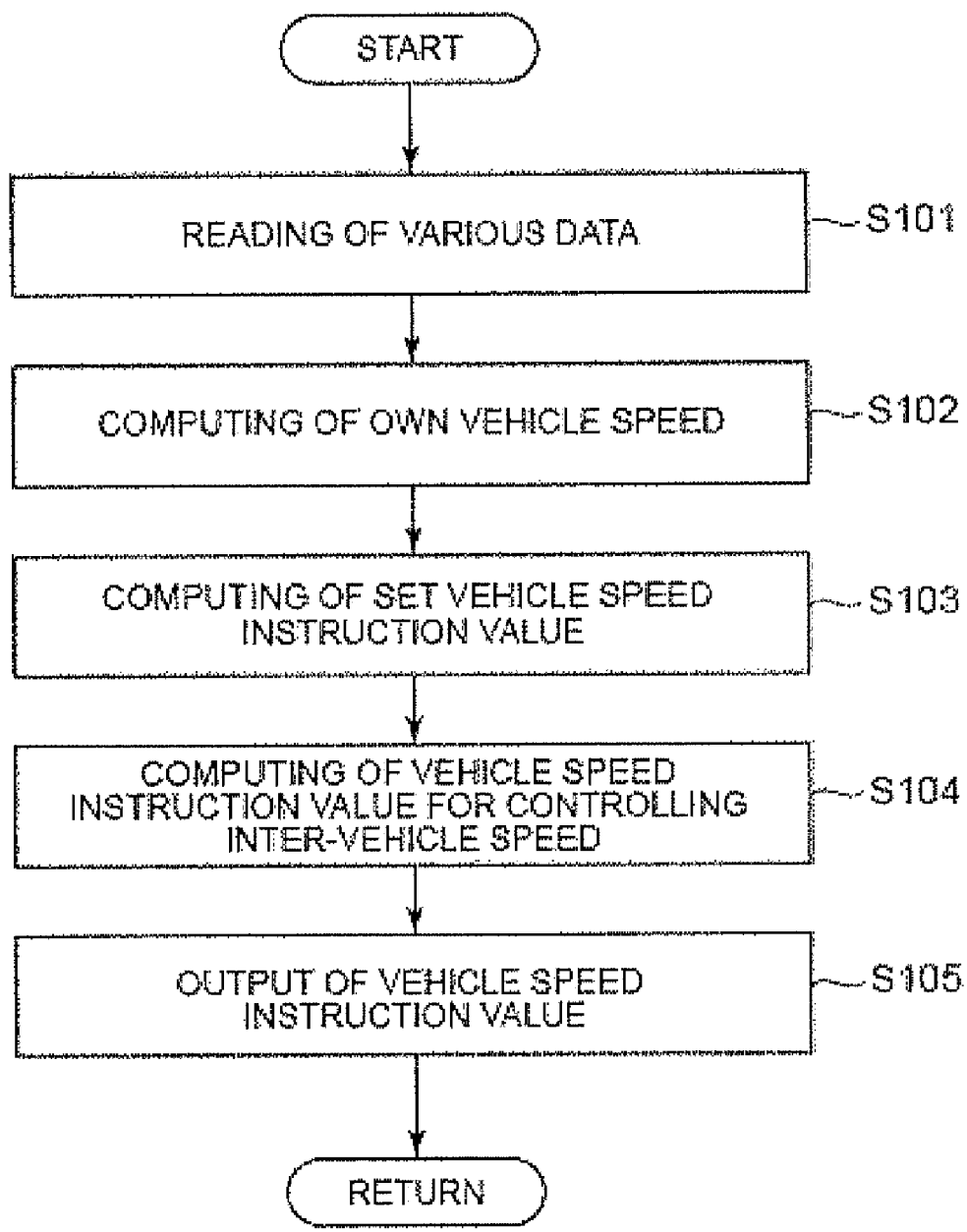
FIG. 6 is a flow chart illustrating processing for a vehicle speed instruction value setting part for controlling inter-vehicle distance when an inter-vehicle distance controlling vehicle speed instruction value is computed and output to a target vehicle speed computing part according to FIG. 1.

In the following, an explanation is given regarding computation of inter-vehicle distance controlling vehicle speed instruction value Vacc with reference to FIG. 6. FIG. 6 is a flow chart illustrating the processing steps for vehicle speed instruction value setting part for controlling inter-vehicle distance 51 when inter-vehicle distance controlling vehicle speed instruction value Vacc is computed and output to target vehicle speed computing part 53. The processing steps shown in FIG. 6 are executed at each prescribed sampling time during the operation of vehicle 100.

In step S101 data are read from the various sensors. That is, the operating signal is read from ACC switch 1; the state of the preceding vehicle is read by laser radar 2, that is, preceding vehicle capture flag indicating the presence/absence of the preceding vehicle, inter-vehicle distance L and vehicle speed difference Vd; and wheel velocity Vw is read from wheel velocity sensor 3. Also, when vehicle 100 is a rear-wheel-drive type vehicle, left/right front wheel velocities Vw1, Vw2 are read. After data are read from the various sensors, process control goes to step S102.

In step S102, vehicle speed V is computed from wheel velocity Vw read in step S101. For example, when vehicle 100 is a rear wheel drive type vehicle, the following formula is used to calculate vehicle speed V based on the average value of left/right front wheel velocities Vw1, Vw2:

$$V=(Vw1+Vw2)/2. \quad (1)$$

After vehicle speed V is computed, process control goes to step S103.

Preset vehicle speed Vset is read in step S103. That is, based on the operating signal of ACC switch 1 read in step S101, the preset vehicle speed set by the driver is used as preset vehicle speed Vset. Also, when the driver sets the current vehicle speed as the preset vehicle speed* (when the vehicle speed flag is set), vehicle speed V computed in step S102 is used preset vehicle speed Vset. After preset vehicle speed Vset is read, process control goes to step S104.

In step S104 inter-vehicle distance controlling vehicle speed instruction value Vacc is computed. When it is judged that there exists a preceding vehicle based on the preceding vehicle capture flag read in step S101, target inter-vehicle distance L* is set by the following formula:

$$L^*=V \times T0+L0; \text{ wherein} \quad (2)$$

T0 is the inter-vehicle time, which is equal to (inter-vehicle distance L/vehicle speed V or preceding vehicle speed Vf); and L0 is the inter-vehicle distance when both vehicles are parked. Also, one may set target inter-vehicle distance L* corresponding to vehicle speed Vf of the preceding vehicle in place of vehicle speed V.

Then, inter-vehicle distance instruction value Lt indicating the variation in time of the inter-vehicle distance until inter-vehicle distance L reaches its target value L* is determined. More specifically, low-pass filter Ft(s) indicated by the following formula is applied with respect to target inter-vehicle distance L*, and inter-vehicle distance instruction value Lt is computed.

$$Ft(s)=\omega^2/(s^2+2\zeta\omega s+\omega); \text{ wherein} \quad (3)$$

ω and ζ represent the intrinsic oscillation frequency and damping coefficient for making the response characteristics in the inter-vehicle distance control system the target response characteristics; and s represents a differential operator.

Then, a feedback compensator is used to compute the target vehicle speed, that is, inter-vehicle distance controlling vehicle speed instruction value Vacc, so that inter-vehicle distance L agrees with inter-vehicle distance instruction value Lt. More specifically, based on the inter-vehicle distance L to the preceding vehicle and the difference in vehicle speed Vd, the following formula is used to compute inter-vehicle distance controlling vehicle speed instruction value Vacc:

$$Vacc=Vf-\{fd(Lt-L)+fv \times Vd\}; \text{ wherein} \quad (4)$$

fd represents the distance control gain;
fv represents the vehicle speed control gain; and
Vf represents the preceding vehicle speed (Vf=V+Vd).

Also, when it is judged in step 101 that that there is no preceding vehicle based on the preceding vehicle capture flag that has been read, preset vehicle speed Vset obtained in step S103 is used as inter-vehicle distance controlling vehicle speed instruction value Vacc.

After inter-vehicle distance controlling vehicle speed instruction value Vacc is computed in step S104, process control goes to step S105. In this step, inter-vehicle distance controlling vehicle speed instruction value Vacc computed in step S104 is output to target vehicle speed computing part 53, and then process control returns to start.

Figure 7:
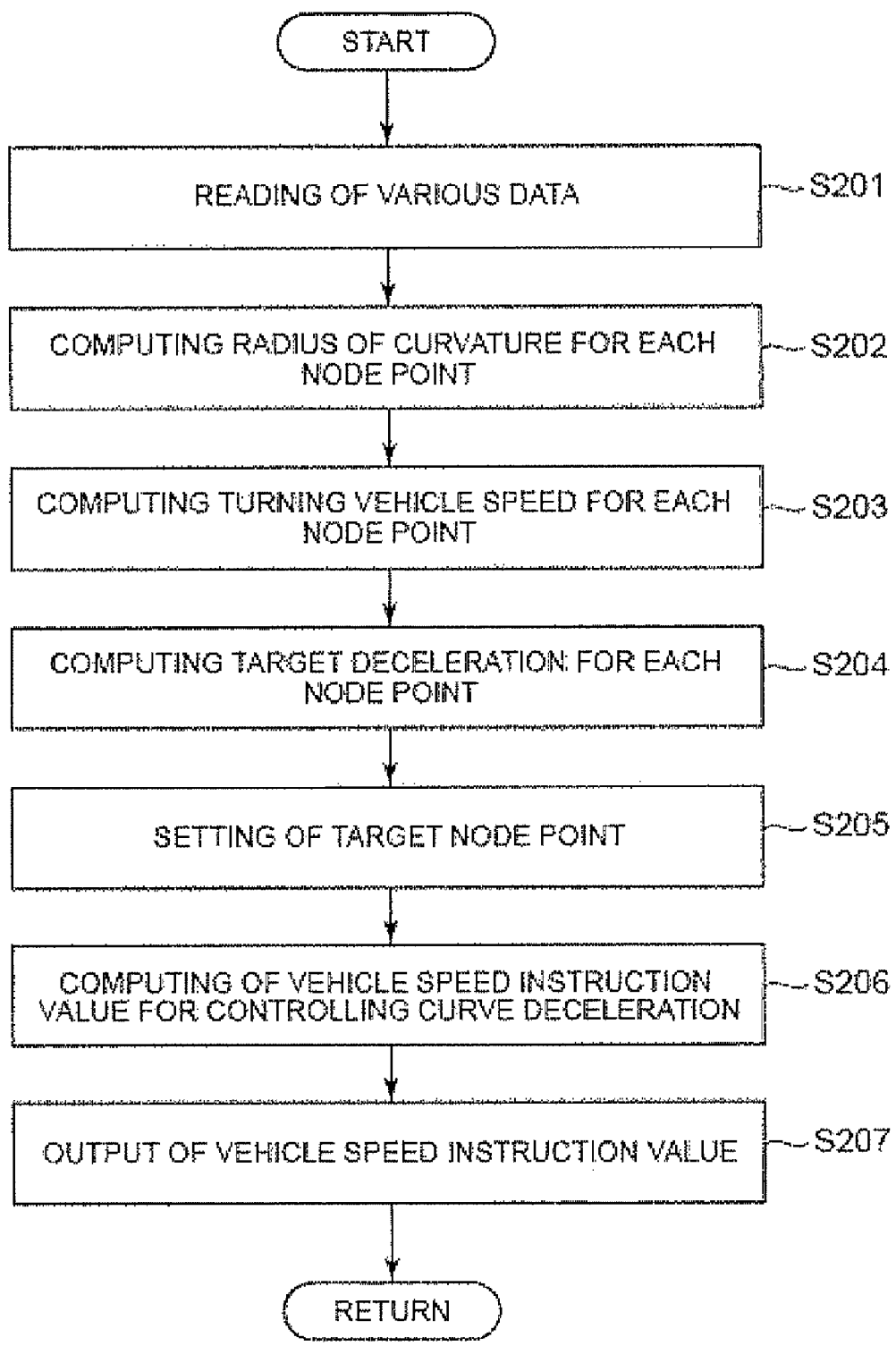
FIG. 7 is a flow chart illustrating processing for a vehicle speed instruction value setting part for controlling curve deceleration when a vehicle speed instruction value for controlling curve deceleration is computed and output to target vehicle speed computing part according to FIG. 1.

In the following, an explanation is given regarding the process of computing vehicle speed instruction value for controlling curve deceleration Vcop with reference to FIG. 7. FIG. 7 is a flow chart illustrating the processing steps for vehicle speed instruction value setting part for controlling curve deceleration 52 when vehicle speed instruction value for controlling curve deceleration Vcop is computed and output to target vehicle speed computing part 53. The process shown in FIG. 7 is executed for each prescribed sampling time during the operation of vehicle 100.

In step S201 the various types of data are read. That is, vehicle speed V is read from vehicle speed instruction value setting part for controlling inter-vehicle distance 51. Also, the position (X, Y) of the vehicle 100 and node point information ((X(n), Y(n), L(n)) for the road ahead of the vehicle 100 are read from navigation device 4. Here, n represents the number attached to each node point (node point number), and n is an integer in the range of 1 to p. The farther the node point from the position of the vehicle 100, the larger the value of the assigned number. A node point with node point number n is represented as NOD (n). Here, ((X(n), Y(n)) are coordinates of node point NOD (n). L(n) represents the distance from the position (X, Y) of vehicle 100 to node point NOD (n). After the various data are read in step S201, process control goes to step S202.

In step S202, radius of curvature R(n) of each node point NOD (n) is computed based on the node point information read in step S201 There are several methods that may be adopted to compute the radius of curvature. Here, radius of curvature R(n) is computed with the known 3-point method. That is, the radius of a circle that passes through three points, node point NOD (n) and the two node points NOD (n−1), NOD (n+1) in front of and behind node point NOD (n), is computed, and this radius is used as radius of curvature R(n) of node point NOD (n). After computing radius of curvature R(n) of node point NOD (n), process control goes to step S203.

In step S203 turning vehicle speed at each node point V(n) is computed, As explained above, said turning vehicle speed at each node point V(n) is the speed with which the vehicle turns at a prescribed lateral acceleration Yg at each node point NOD (n), and it is computed using the following formula based on radius of curvature R(n) computed in step 3202:

$$V(n)^2 = Yg \times |R(n)|. \tag{5}$$

Here, for example, lateral acceleration Yg is set to 0.4 g. Also, lateral acceleration Yg may be set to other values by the driver. As can be seen from formula (5), turning vehicle speed at each node point V(n) increases with radius of curvature R(n). After turning vehicle speed for each node point V(n) is computed, process control goes to step S204.

Target deceleration for each node point G(n) is computed in step S204. Here, target deceleration for each node point G(n) is the deceleration required to bring vehicle speed V at each node point NOD (n) to turning vehicle speed at each node point V(n). Target deceleration at each node point G(n) can be determined using the following formula from vehicle speed V and distance L(n) at each node point NOD (n) determined in step S201 and turning vehicle speed at each node point V(n) computed in step 3203:

$$G(n) = (V^2 - V(n)^2)/(2 \times L(n)) = (V2 - Yg \times |R(n)|)/(2 \times L(n)). \tag{6}$$

Target deceleration at each node point G(n) is positive when vehicle 100 is decelerated. As can be seen from formula (6), target deceleration at each node point G(n) increases as turning vehicle speed at each node point at V(n) decreases (that is, as radius of curvature R(n) decreases) and as distance L(n) decreases. After computing target deceleration at each node point G(n), process control goes to step S205.

The target node point is set in S205. That is, from various node points NOD, the node point NOD having the largest value of the plurality of target deceleration values at each node point G(n) computed in step S204 is selected as the target node point. Here, assuming that the node point NOD number of the target node point is N, the data pertaining to each node point NOD with "(n)" equal to "(N)" indicate the data pertaining to the target node point. After the target node point is set, process control goes to step S206.

In step S206 vehicle speed instruction value for controlling curve deceleration Vcop is computed. More specifically, based on distance L(N) to the target node point set in step S205 and turning vehicle speed at each node point V(N) for each target node point, vehicle speed instruction value for controlling curve deceleration Vcop is computed using the following formula.

$$Vcop^2 = V(N)^2 + 2 \times G \times L(N) \tag{7}$$

That is, vehicle speed instruction value for controlling curve deceleration Vcop is computed in accordance with the curvature of the road ahead of vehicle 100. Vehicle speed instruction value for controlling curve deceleration Vcop is the instruction value for decelerating the vehicle with a prescribed deceleration G from position (X, Y) of vehicle 100 so that when the vehicle 100 reaches the target node point, vehicle speed V is brought to turning vehicle speed at each node point V(N).

Here, for example, deceleration G is set to 0.12 g. Also, deceleration G may be set to other values by the driver. As can be seen from formula (7), vehicle speed instruction value for controlling curve deceleration Vcop increases as turning vehicle speed at each node point V(N) increases, deceleration G increases and distance L(N) increases. On the other hand, vehicle speed instruction value for controlling curve deceleration Vcop decreases as turning vehicle speed at each node point V(N) decreases, deceleration G decreases and distance L(N) decreases.

Vehicle speed instruction value for controlling curve deceleration Vcop is set so that after passing the target node point, vehicle speed rises at a prescribed rate of change, where turning vehicle speed at each node point V(N) is the upper limit of the vehicle speed.

After vehicle speed instruction value for controlling curve deceleration Vcop is computed, process control goes to step S207.

In step S207 vehicle speed instruction value for controlling curve deceleration Vcop computed in step S206 is output to target vehicle speed computing part 53. Then, process control returns to start.

Figure 8:
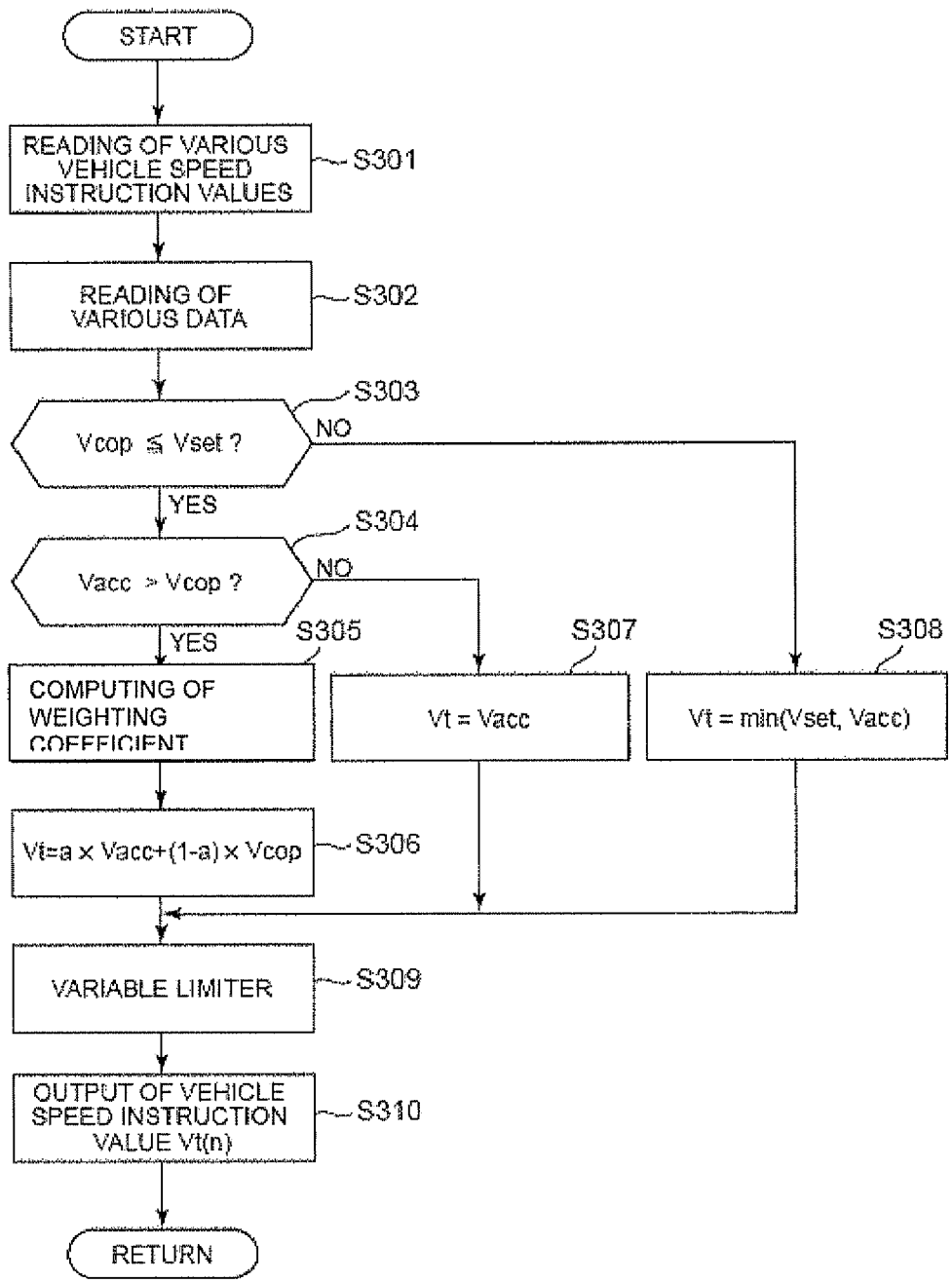
FIG. 8 is a flow chart illustrating processing for a target vehicle speed computing part when a target vehicle speed is computed and output to a vehicle speed controller according to FIG. 1.

In the following, an explanation is given regarding the computation of target vehicle speed Vt with reference to FIG. 8. FIG. 8 is a flow chart that shows the processing steps for target vehicle speed computing part 53 when target vehicle speed Vt is computed and output to vehicle speed controller

54. The processing steps shown in FIG. 8 are executed at each prescribed sampling time during the operation of vehicle 100.

The various vehicle speed instruction values are read in step S301. More specifically, preset vehicle speed Vset and inter-vehicle distance controlling vehicle speed instruction value Vacc are read from vehicle speed instruction value setting part for controlling inter-vehicle distance 51, and vehicle speed instruction value for controlling curve deceleration Vcop is read from vehicle speed instruction value setting part for controlling curve deceleration 52. After these vehicle speed instruction values are read, process control goes to step S302.

In step S302 various data are read. More specifically, vehicle speed V and vehicle speed difference Vd are read from vehicle speed instruction value setting part for controlling inter-vehicle distance 51, and radius of curvature Rc and distance to curve Lc are read. Radius of curvature Rc and distance to curve Lc are radius of the curve R(N) and distance L(N) to the curve at the target node point set by vehicle speed instruction value setting part for controlling curve deceleration 52, respectively. After the various data are read, process control goes to step S303.

In step S303, vehicle speed instruction value for controlling curve deceleration Vcop and preset vehicle speed Vset read in step S301 are compared. When vehicle speed instruction value for controlling curve deceleration Vcop is less than or equal to preset vehicle speed Vset, process control goes to step S304. If the judgment in step S303 is no (that is, Vcop is greater than Vset), process control goes to step S308.

In step S304, vehicle speed instruction value for controlling curve deceleration Vcop and inter-vehicle distance controlling vehicle speed instruction value Vacc read in step S301 are compared. If vehicle speed instruction value for controlling curve deceleration Vcop is smaller than inter-vehicle distance controlling vehicle speed instruction value Vacc, process control goes to step S305. If the judgement in step S304 is no (that is, Vcop is greater than or equal to Vacc), process control goes to step S307.

Weighting coefficient a is set in step S305. As explained below, weighting coefficient a is a coefficient indicating the degree of contribution (weighting) of vehicle speed instruction value for controlling curve deceleration Vcop and inter-vehicle distance controlling vehicle speed instruction value Vacc at the time of calculating target vehicle speed Vt. The value of weighting coefficient a ranges from 0 to 1. In one embodiment, weighting coefficient a has a fixed value preset during the manufacturing stage of vehicle 100. However, it may also be set as desired by the driver. After weighting coefficient a is set, process control goes to step S306.

In step S306 the following formula is used to compute target vehicle speed Vt based on vehicle speed instruction value for controlling curve deceleration Vcop and inter-vehicle distance controlling vehicle speed instruction value Vacc read in step S301, as well as weighting coefficient a set in step S305:

$$Vt = a \times Vacc + (1-a) \times Vcop. \quad (8)$$

As can be seen from formula (8), target vehicle speed Vt has a value between the value of inter-vehicle distance controlling vehicle speed instruction value Vacc and the value of vehicle speed instruction value for controlling curve deceleration Vcop. As the value of weighting coefficient a approaches 1, target vehicle speed Vt approaches the value of inter-vehicle distance controlling vehicle speed instruction value Vacc. On the other hand, as weighting coefficient a approaches 0, target vehicle speed Vt approaches the value of vehicle speed instruction value for controlling curve deceleration Vcop. After target vehicle speed Vt is computed, process control goes to step S309.

Target vehicle speed Vt is alternatively set in step S307. More specifically, inter-vehicle distance controlling vehicle speed instruction value Vacc read in step S301 is set as target vehicle speed Vt. After target vehicle speed Vt is set, process control goes to Step S309.

As yet another alternative, target vehicle speed Vt is set in step S308. More specifically, preset vehicle speed Vset and inter-vehicle distance controlling vehicle speed instruction value Vacc read in step S301 are compared, and the smaller value is set as target vehicle speed Vt. After target vehicle speed Vt is set, process control goes to step S309.

In step S309 a variable limiting process that limits the variation of target vehicle speed Vt computed and set in one of step S306, step S307 or step S308 is performed. More specifically, target vehicle speed Vt set during the last processing cycle and target vehicle speed Vt set during the current processing cycle are compared. The value of target vehicle speed Vt set during the current processing cycle is corrected so that the variation does not exceed a prescribed ratio.

In step S310 target vehicle speed Vt obtained by the variable limiting process in step S309 is output as the speed instruction value to vehicle speed controller 54. Then, process control returns to start.

For vehicle 100 with this constitution, when ACC switch 1 is manipulated to a control instruction for the inter-vehicle distance, if the vehicle travels over an approximately straight road (so that the judgment in step S303 is no), the vehicle speed is controlled so that it follows the preceding vehicle while maintaining a prescribed inter-vehicle distance (step S308). On the other hand, if there is no preceding vehicle or the preceding vehicle is traveling at a faster speed than the preset vehicle speed set by the driver, the vehicle speed is controlled to the preset vehicle speed set by the driver (step S308). When vehicle 100 reaches a curve while following a preceding vehicle, the speed of vehicle 100 is controlled as described below.

Figure 9:
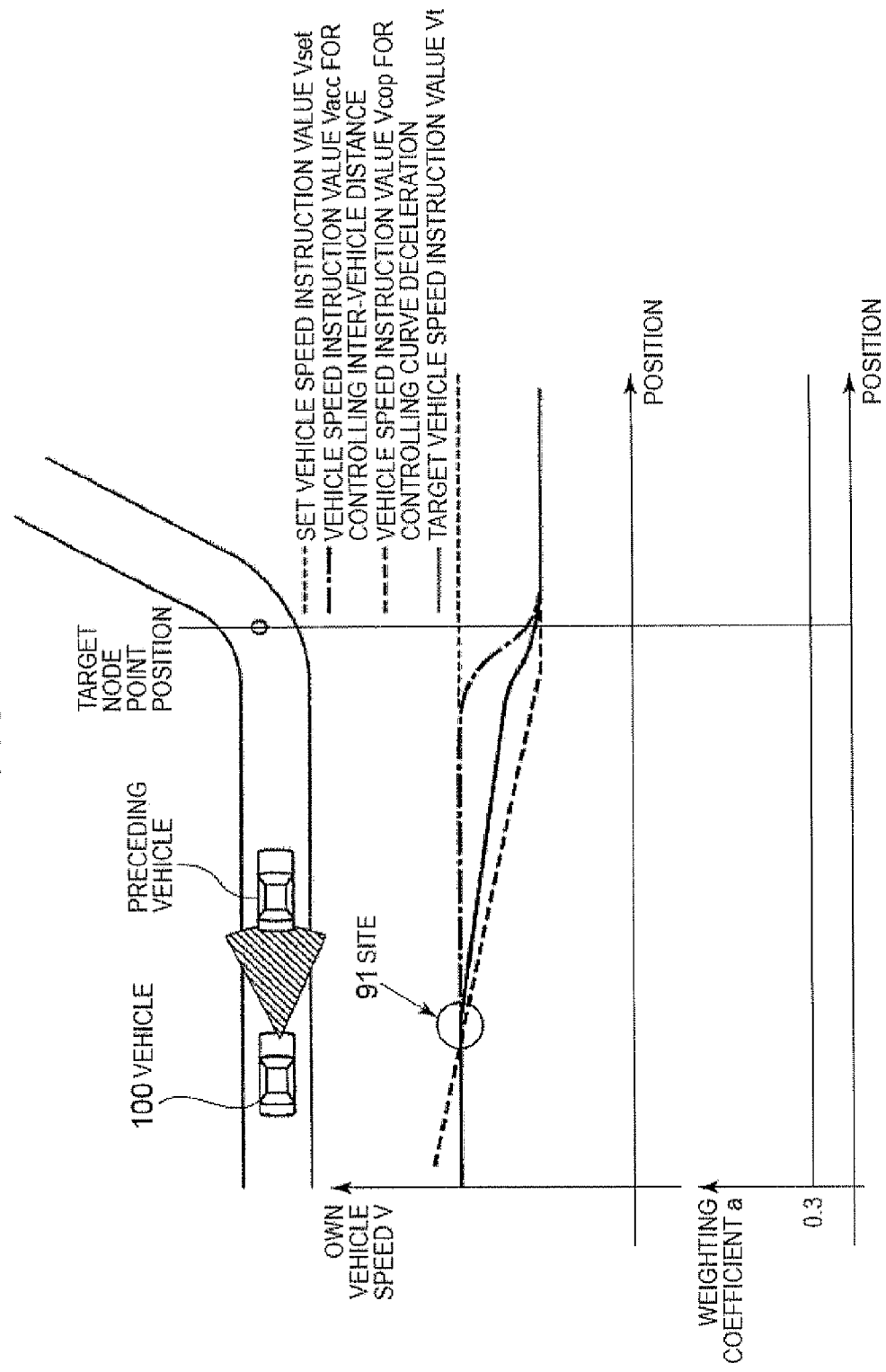
FIG. 9 is a diagram illustrating the variation of the various instruction values when a vehicle follows a preceding vehicle as they approach an upcoming curve.

FIG. 9 is a diagram illustrating variations in the various instruction values when a curve appears in the road ahead as vehicle 100 follows a preceding vehicle. In FIG. 9 weighting coefficient a is set to 0.3. It is farther assumed that the preceding vehicle is traveling at nearly the same speed as the preset vehicle speed of vehicle 100 in the straight section of road before the curve, and then the preceding vehicle sufficiently decelerates directly ahead of the curve so as to pass through the curve at a safe speed. When there is sufficient distance from the target node point and the vehicle 100 is present before site 91 shown in FIG. 9, vehicle speed instruction value for controlling curve deceleration Vcop is larger than preset vehicle speed Vset (judgement in step S303 is no). Consequently, target vehicle speed Vt is equal to preset vehicle speed Vset (or inter-vehicle distance controlling vehicle speed instruction value Vacc) (according to step S308). As a result, vehicle 100 follows while maintaining the prescribed inter-vehicle distance.

As explained above, vehicle speed instruction value for controlling curve deceleration Vcop is smaller when distance L(N) is shorter. Consequently, at a certain site, vehicle speed instruction value for controlling curve deceleration Vcop is equal to preset vehicle speed Vset and inter-vehicle distance controlling vehicle speed instruction value Vacc. This site is taken as site 91. That is, when vehicle 100 arrives at site 91, vehicle speed instruction value for controlling curve deceleration Vcop will be equal to preset vehicle speed Vset and inter-vehicle distance controlling vehicle speed instruction value Vacc (so that the judgment in step S303 is yes). Then, as vehicle 100 passes site 91, vehicle speed instruction value for controlling curve deceleration Vcop becomes smaller than preset vehicle speed Vset and inter-vehicle distance controlling vehicle speed instruction value Vacc (so that the judgment in step S304 is yes).

As a result, target vehicle speed Vt is computed using formula (8) in step S306, but vehicle speed instruction value for controlling curve deceleration Vcop is smaller than preset vehicle speed Vset and inter-vehicle distance controlling vehicle speed instruction value Vacc. Accordingly, computed target vehicle speed Vt is smaller than preset vehicle speed Vset and inter-vehicle distance controlling vehicle speed instruction value Vacc. That is, vehicle 100 is controlled to decelerate after passing site 91.

The target vehicle speed Vt of a vehicle with a conventional vehicle controller will be set to a vehicle speed instruction value for controlling curve deceleration Vcop that is below inter-vehicle distance controlling vehicle speed instruction value Vacc once vehicle 100 passes site 91 so that the difference between its vehicle speed and that of the preceding vehicle increases. This makes the driver feel like he is lagging behind the preceding vehicle (the feeling that he can't keep up). On the other hand, the target vehicle speed Vt of a vehicle 100 with the vehicle controller as taught herein will be set to a value between inter-vehicle distance controlling vehicle speed instruction value Vacc and vehicle speed instruction value for controlling curve deceleration Vcop determined by weighting coefficient a, and the difference in vehicle speed between the two vehicles will not increase significantly. That is, within the range in which inter-vehicle distance controlling vehicle speed instruction value Vacc is not exceeded, since target vehicle speed Vt is higher than that in known methods, the inter-vehicle distance is not significantly reduced. The feeling that the driver is lagging behind can be alleviated.

In this embodiment, the value of weighting coefficient a is set to 0.3 so that target vehicle speed Vt becomes closer to vehicle speed instruction value for controlling curve deceleration Vcop than inter-vehicle distance controlling vehicle speed instruction value Vacc. By appropriately changing and setting weighting coefficient a, it is possible to easily adjust the degree of priority of control of the inter-vehicle distance and curve deceleration control.

The vehicle cruise control in this first embodiment has the following operation and effects.

First, the constitution is such that inter-vehicle distance controlling vehicle speed instruction value Vacc is computed corresponding to the state of the preceding vehicle, that is, the presence/absence of the preceding vehicle, inter-vehicle distance L and vehicle speed difference Vd. Vehicle speed instruction value for controlling curve deceleration Vcop is computed corresponding to the state of the curve that lies ahead of vehicle 100. Also, the constitution is such that vehicle speed V is controlled to equal target vehicle speed Vt computed based on inter-vehicle distance controlling vehicle speed instruction value Vacc, vehicle speed instruction value for controlling curve deceleration Vcop and weighting coefficient a. As a result, it is possible for target vehicle speed Vt and vehicle speed V to be higher than the corresponding speeds according to known methods while within the range that does exceed inter-vehicle distance controlling vehicle speed instruction value Vacc. As a result, it is possible to alleviate the feeling that the driver is lagging behind without reducing the inter-vehicle distance. Since this feeling can be alleviated, it is possible for the driver to avoid stepping down on the accelerator pedal, etc., which prevents him from feeling bothered by performing these operations.

Second, the constitution is such that in the processing performed by cruise control 5, target vehicle speed Vt is computed based on inter-vehicle distance controlling vehicle speed instruction value Vacc, vehicle speed instruction value for controlling curve deceleration Vcop and weighting coefficient a. As a result, the feeling that the driver is lagging behind can be alleviated without adding a new device through a change in software so that costs can be kept low.

Third, in a conventional vehicle that performs vehicle speed control only by means of inter-vehicle distance controlling vehicle speed instruction value Vacc, in the case when the vehicle is following a preceding vehicle, for example, if the driver of the preceding vehicle on a curve does not decelerate soon enough, the driver of the following vehicle must step on the brake to decelerate, which is bothersome to the driver. On the other hand, in vehicle 100 of the present embodiment, the constitution is such that target vehicle speed Vt is set to a value between inter-vehicle distance controlling vehicle speed instruction value Vacc and vehicle speed instruction value for controlling curve deceleration Vcop determined by weighting coefficient a. Consequently, compared with the conventional vehicle that controls vehicle speed only by inter-vehicle distance controlling vehicle speed instruction value Vacc, vehicle speed V here is reduced before the curve so that it is possible for the driver to reduce the braking operation and the feeling of being bothered that accompanies such an operation.

Fourth, if weighting coefficient a is a preset fixed value, simple tuning such as changing the preset value of weighting coefficient a may not be enough to reduce the driver's feeling that he is lagging behind. However, when the constitution is such that weighting coefficient a can be set to will by the driver, it is possible to change the extent of reduction of the feeling that the driver is lagging behind so that it is possible to reflect the driver's preferences.

Fifth, the constitution is such that the value of target vehicle speed Vt set during the current cycle is corrected so that the variation between target vehicle speed Vt set for execution during the last processing cycle and target vehicle speed Vt set for execution during the current processing cycle does not exceed a prescribed ratio. As a result, it is possible to suppress drastic changes in vehicle speed V, possibly suppressing discomfort of passengers in vehicle 100 that accompany such changes in vehicle speed V.

In the following, an explanation is given regarding a second embodiment of the vehicle cruise control disclosed herein with reference to FIG. 10. The same part numbers as were used in the first embodiment are used again here, and their explanation will mainly entail only the points of difference. The vehicle cruise control of the second embodiment differs from the vehicle cruise control of the first embodiment in that weighting coefficient a is set corresponding to distance to curve Lc. That is, in the vehicle cruise control of the second embodiment, weighting coefficient a is changed. When distance to curve Lc as distance L(n) for the target node point is long, the value of weighting coefficient a is 1 or approximately 1, and as distance to curve Lc becomes shorter, the value of weighting coefficient a becomes smaller.

Figure 10:
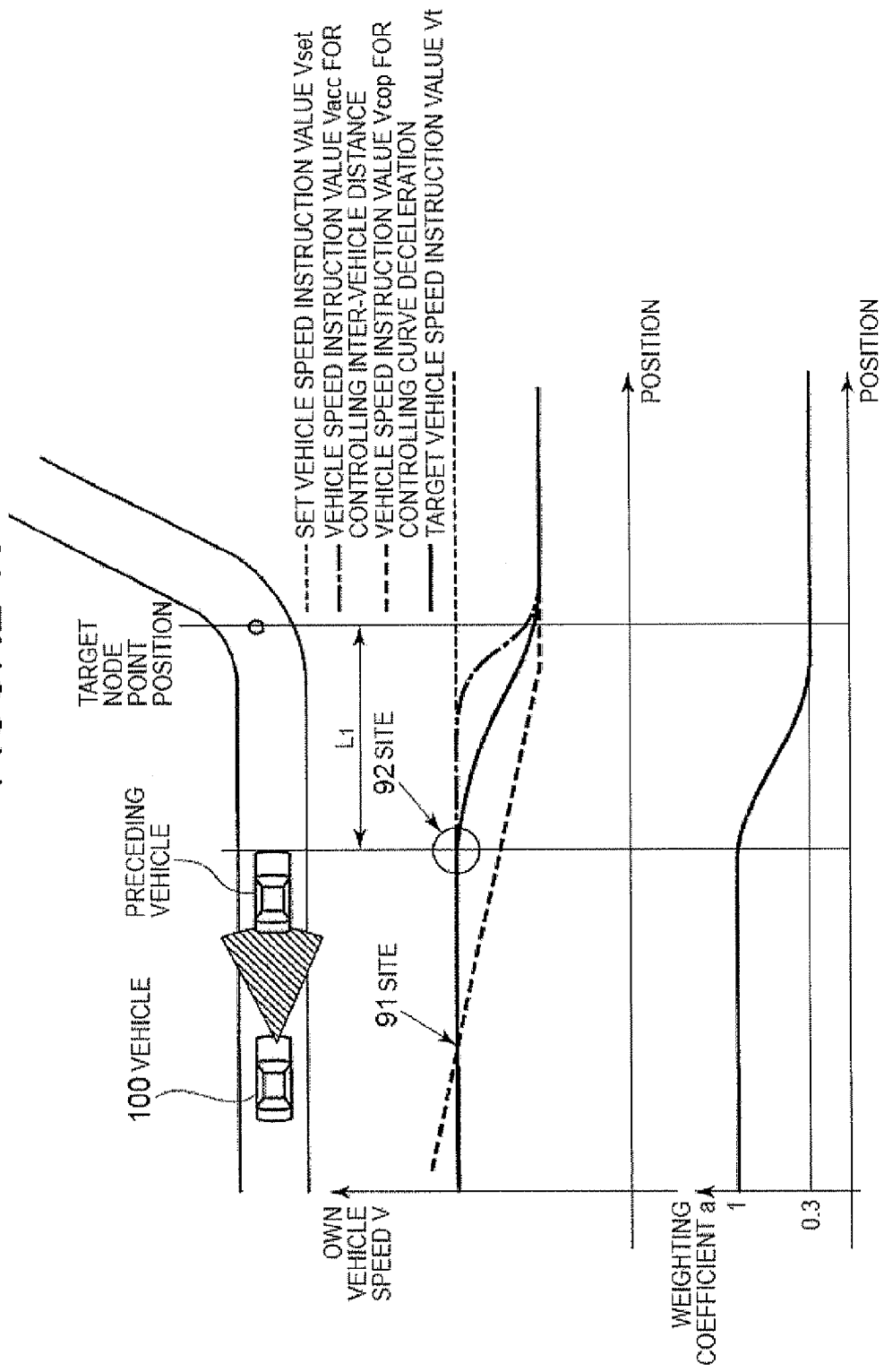
FIG. 10 is a diagram illustrating the variation of the various instruction values and a weighting coefficient when a vehicle follows a preceding vehicle as they approach an upcoming curve in a second embodiment.

FIG. 10 is a diagram illustrating variations in the various instruction values and weighting coefficient a when vehicle 100 follows a preceding vehicle and reaches a curve ahead of the vehicle 100. In FIG. 10, weighting coefficient a is changed from 1 to 0.3 corresponding to distance to curve Lc. Also, it is assumed that the preceding vehicle travels at nearly the same speed as the preset vehicle speed of vehicle 100 in the straight section of the road before the curve and that the preceding vehicle is sufficiently decelerated immediately before the curve to pass through the curve at a safe speed.

Also, between site 91 and the target node point, with site 92 before the target node point by distance L1 used as a reference, when vehicle 100 is in the region where distance to curve Lc meets or exceeds distance L1 (L1≦Lc), that is, the region before site 92, weighting coefficient a is set to 1. When vehicle 100 is in the region where distance to curve Lc is shorter than distance L1 (0<Lc<L1), that is, the region from site 92 to the target node point, as distance to curve Lc becomes shorter, weighting coefficient a is gradually reduced from 1 to 0.3.

That is, when it is judged that distance to curve Lc read from vehicle speed instruction value setting part for controlling curve deceleration 52 meets or exceeds distance L1, target vehicle speed computing part 53 sets weighting coefficient a to 1. On the other hand, when it is judged that distance to curve Lc read from vehicle speed instruction value setting part for controlling curve deceleration 52 is smaller than distance L1, target vehicle speed computing part 53 gradually reduces weighting coefficient a from 1 to 0.3 corresponding to the distance to curve Lc. According to one embodiment, the upper/lower limits of weighting coefficient a and distance L1 are preset during the manufacturing stage of vehicle 100. However, they may also be set at will by the driver.

When the position of the vehicle 100 is well away from the target node point and before it reaches site 91, vehicle speed instruction value for controlling curve deceleration Vcop is larger than preset vehicle speed Vset so that target vehicle speed Vt is equal to preset vehicle speed Vset (or inter-vehicle distance controlling vehicle speed instruction value Vacc). As a result, vehicle 100 travels while maintaining the prescribed inter-vehicle distance from the preceding vehicle.

After vehicle 100 passes site 91, vehicle speed instruction value for controlling curve deceleration Vcop is smaller than preset vehicle speed Vset and inter-vehicle distance controlling vehicle speed instruction value Vacc. Consequently, target vehicle speed Vt is set to the value computed using formula (8). However, since weighting coefficient a is 1 before site 92, computed target vehicle speed Vt is equal to inter-vehicle distance controlling vehicle speed instruction value Vacc. That is, although vehicle 100 has passed site 91, it is still unaffected by the vehicle speed instruction value for controlling curve deceleration Vcop, and it follows the preceding vehicle according to inter-vehicle distance controlling vehicle speed instruction value Vacc. Since the preceding vehicle has not decelerated, vehicle 100 also has not decelerated.

After vehicle 100 has passed site 92, weighting coefficient a is gradually reduced from 1. Consequently, target vehicle speed Vt computed using formula (8) gradually approaches vehicle speed instruction value for controlling curve deceleration Vcop from inter-vehicle distance controlling vehicle speed instruction value Vacc and becomes smaller. That is, control is performed such that vehicle 100 begins to decelerate from the time it passes site 92. Unlike the first embodiment, in the second embodiment the site where deceleration of vehicle 100 begins is shifted from site 91 to site 92, that is, toward the target node point, As a result, it is possible to further alleviate the feeling that the driver is lagging behind.

In addition to the operation and effects of the cruise control of the first embodiment, the cruise control of the second embodiment exhibits the following operation and effects.

First, since the constitution is such that weighting coefficient a is set in accordance with curve Lc, it is possible to set a more appropriate weighting coefficient a in accordance with curve Lc. As a result, it is possible to further alleviate the feeling that the driver is lagging behind.

Second, since it is possible to set at will the site where vehicle speed instruction value for controlling curve deceleration Vcop begins to influence target vehicle speed Vt, that is, the site where gradual reduction of weighting coefficient a begins, it is also possible to move the site where vehicle speed instruction value for controlling curve deceleration Vcop begins to influence deceleration toward the target node point. As a result, it is possible to effectively alleviate the feeling that the driver is lagging behind.

In the following, an explanation is given regarding the third embodiment of the vehicle cruise control of the present disclosure. In the following explanation, the same part numbers that were used in the first and second embodiments are used again, and their explanation will primarily entail the points of difference. The vehicle cruise control of the third embodiment differs from those of the first and second embodiments in that when distance to curve Lc exceeds distance L1, weighting coefficient a is set to 1, and when distance to curve Lc is shorter than distance L1, weighting coefficient a is set based on plural auxiliary weighting coefficients.

In the vehicle cruise control of the third embodiment, auxiliary weighting coefficient for the vehicle 100 a1, auxiliary weighting coefficient for the radius of curvature a2, auxiliary weighting coefficient for the distance to curve a3 and auxiliary weighting coefficient for the vehicle speed difference a4 are set. In this case, auxiliary weighting coefficient for the vehicle 100 a1 is the auxiliary weighting coefficient set to correspond to vehicle speed V, and auxiliary weighting coefficient a1 is set to a smaller value when vehicle speed V is lower. Auxiliary weighting coefficient for the radius of curvature a2 is an auxiliary weighting coefficient a2 set to correspond to radius of curvature Rc. Auxiliary weighting coefficient a2 is set to a smaller value when radius of curvature Rc is smaller.

Auxiliary weighting coefficient for the distance to curve a3 is an auxiliary weighting coefficient a3 set to correspond to distance to curve Lc. When distance to curve Lc exceeds distance L1, auxiliary weighting coefficient a3 is set to 1. When distance to curve Lc is greater than 0 and less than distance L1, auxiliary weighting coefficient a3 is set gradually smaller from 1 to 0.5, corresponding to distance to curve Lc. Auxiliary weighting coefficient for the vehicle speed difference a4 is an auxiliary weighting coefficient a4 set to correspond to vehicle speed difference Vd. Auxiliary weighting coefficient a4 is set to be smaller when vehicle speed difference Vd is smaller.

When distance to curve Lc is shorter than distance L1, weighting coefficient a is set as a product of the various auxiliary weighting coefficients as shown in the following formula:

$$a = a1 \times a2 \times a3 \times a4 \qquad (9)$$

Also, weighting coefficient a may be set as a sum of the various auxiliary weighting coefficients.

For the vehicle cruise control of the third embodiment, the range in which auxiliary weighting coefficients a1-a4 may be set is from 0.5 to 1. By defining the range in which auxiliary weighting coefficients a1-a4 can be set, it is possible to define the ranges of influences of auxiliary weighting coefficients a1-a4 with respect to weighting coefficient a. For example, when the range in which the values of the auxiliary weighting coefficients can be set is made narrower, it is possible to reduce the influence of variations of the auxiliary weighting coefficients on weighting coefficient a. On the other hand, when the range in which the values of the auxiliary weighting coefficients can be set is made wider, the influence of the auxiliary weighting coefficients on weighting coefficient a becomes greater.

Figure 11:
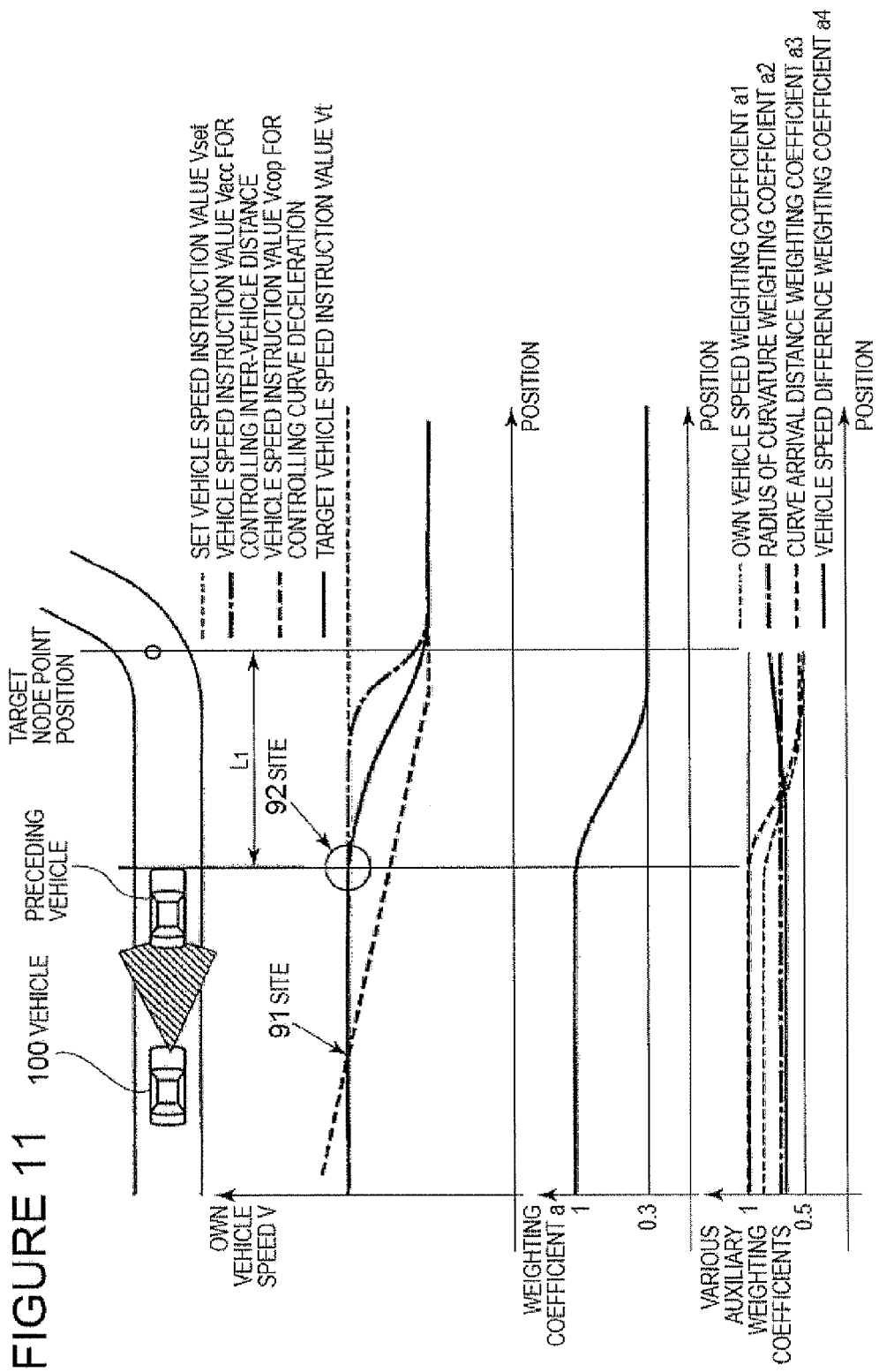
FIG. 11 is a diagram illustrating the variation of the various instruction values and a weighting coefficient when a vehicle follows a preceding vehicle as they approach an upcoming curve in a third embodiment.

FIG. 11 is a diagram illustrating variations in the various instruction values, weighting coefficient a and auxiliary weighting coefficients a1-a4 when vehicle 100 follows a preceding vehicle toward an upcoming curve. In FIG. 11, the preceding vehicle runs at nearly the same speed as the preset vehicle speed of vehicle 100, in the straight region before the curve, and the preceding vehicle then sufficiently decelerates immediately before the curve and then passes through the curve at a safe speed.

When the position of the vehicle 100 is sufficiently away from the target node point, that is, ahead of site 91, because vehicle speed instruction value for controlling curve deceleration Vcop is larger than preset vehicle speed Vset, target vehicle speed Vt will be equal to preset vehicle speed Vset (or inter-vehicle distance controlling vehicle speed instruction value Vacc). As a result, vehicle 100 travels while maintaining a prescribed inter-vehicle distance from the preceding vehicle.

After vehicle 100 has passed site 91, because vehicle speed instruction value for controlling curve deceleration Vcop is lower than preset vehicle speed Vset and inter-vehicle distance controlling vehicle speed instruction value Vacc, target vehicle speed Vt is set to the value computed by formula (8). However, in the region ahead of site 92, since distance to curve Lc exceeds distance L1, weighting coefficient a is set to 1, and computed target vehicle speed Vt is equal to inter-vehicle distance controlling vehicle speed instruction value Vacc. That is, even after vehicle 100 has passed site 91, there is still no influence of vehicle speed instruction value for controlling curve deceleration Vcop, and vehicle 100 follows the preceding vehicle according to inter-vehicle distance controlling vehicle speed instruction value Vacc. Here, since the preceding vehicle has not decelerated, vehicle 100 also does not decelerate.

After vehicle 100 passes site 92, the value of weighting coefficient a is changed from 1 to that computed with formula (9). As shown in FIG. 11, because auxiliary weighting coefficients a2-a4 as well as auxiliary weighting coefficient a1 for vehicle 100 have values smaller than 1, the value of weighting coefficient a will be smaller than 1 after vehicle 100 passes site 92. Consequently, after vehicle 100 passes site 92 it begins to decelerate under the influence of vehicle speed instruction value for controlling curve deceleration Vcop. The value of auxiliary weighting coefficient a1 for vehicle 100 decreases as vehicle speed V falls. After vehicle 100 passes site 92, since distance to curve Lc is shorter than distance L1, the value of auxiliary weighting coefficient for the distance to curve a3 is set so that it gradually falls from 1 to 0.5 corresponding to distance to curve Lc. Furthermore, because vehicle 100 decelerates and vehicle speed difference Vd gradually increases after it passes site 92, the value of auxiliary weighting coefficient for the vehicle speed difference a4 begins to increase from the value it had after passing site 91.

In this way, the values of auxiliary weighting coefficients a1, a3 and a4 are changed. The changes in the values of auxiliary weighting coefficients a1, a3 and a4 are set so that the influence of the decrease in the values of auxiliary weighting coefficient a1 for vehicle 100 and auxiliary weighting coefficient for the distance to curve a3 is larger than the influence of the increase in the value of auxiliary weighting coefficient for the vehicle speed difference a4. Consequently, weighting coefficient a drops as vehicle 100 approaches the target node point in the region after site 92. Consequently, target vehicle speed Vt computed with formula (8) is gradually reduced from the value of inter-vehicle distance controlling vehicle speed instruction value Vacc toward the value of vehicle speed instruction value for controlling curve deceleration Vcop. That is, control is executed so that vehicle 100 begins to decelerate once it passes site 92. As in the second embodiment, in the third embodiment the site where deceleration of vehicle 100 begins is moved from site 91 toward site 92, that is, nearer the target node point. As a result, it is possible to further alleviate the driver's feeling that he is lagging behind.

In addition to the operation and effects of the first and second embodiments, the following operation and effects also can be realized with the vehicle cruise control of the third embodiment.

First, since the constitution is such that weighting coefficient a is set based on plural auxiliary weighting coefficients, even when there are variations in the various factors such as the travel states of the preceding vehicle and the vehicle 100, the state of the road ahead, etc., it is still possible to set weighting coefficient a appropriately. As a result, it is possible to appropriately alleviate the drivers feeling that he is lagging behind corresponding to the state of the vehicle 100 and the surrounding conditions.

Second, the constitution is such that auxiliary weighting coefficient a1 for vehicle 100 can be set as the sole auxiliary weighting coefficient. As a result, it is possible to set an appropriate weighting coefficient a that corresponds to vehicle speed V. It is thus possible to alleviate the driver's feeling that he is lagging behind corresponding to vehicle speed V. For example, even for the same inter-vehicle time, the higher the vehicle speed the greater the inter-vehicle distance. Consequently, even when the inter-vehicle time is increased as the vehicle speed increases, the stronger the driver's feeling that he is lagging behind, By means of a constitution in which auxiliary weighting coefficient a1 for vehicle 100 is set to a larger value for higher vehicle speed V, the higher the vehicle speed V the larger the weighting coefficient a. Accordingly, it is possible to reduce the degree of influence of vehicle speed instruction value for controlling curve deceleration Vcop on target vehicle speed Vt. Consequently, the higher the vehicle speed V, the lower the deceleration of vehicle speed V and the shorter the inter-vehicle time. Consequently, it is possible to appropriately alleviate the driver's feeling that he is lagging behind.

Third, the constitution is such that auxiliary weighting coefficient for the radius of curvature a2 can be set as the sole auxiliary weighting coefficient. As a result, it is possible to appropriately alleviate the driver's feeling that he is lagging behind corresponding to radius of curvature Rc. As radius of curvature Rc becomes larger, vehicle speed V when passing through the curve becomes higher. However, as explained above, the higher the vehicle speed, the stronger the driver's feeling that he is lagging behind. By means of a constitution in which auxiliary weighting coefficient for the radius of curvature a2 is set to a larger value when radius of curvature Rc is larger, it is possible to increase weighting coefficient a for a larger radius of curvature Rc so as to reduce the degree of influence of vehicle speed instruction value for controlling curve deceleration Vcop on target vehicle speed Vt. Consequently, the larger the radius of curvature Rc, the lower the deceleration of vehicle speed V and the shorter the inter-vehicle time. As a result, it is possible to appropriately alleviate the driver's feeling that he is lagging behind.

Fourth, by means of a constitution in which auxiliary weighting coefficient for the distance to curve a3 is set as the sole auxiliary weighting coefficient, it is possible to set weighting coefficient a corresponding to distance to curve Le. As a result, it is possible to further alleviate the driver's feeling that he is lagging behind.

Fifth, the constitution is such that auxiliary weighting coefficient for the vehicle speed difference a4 can be set as the sole auxiliary weighting coefficient. As a result, it is possible to appropriately alleviate the driver's feeling that he is lagging behind corresponding to vehicle speed difference Vd. Although the greater the vehicle speed difference Vd, the stronger the driver's feeling that he is lagging behind, by means of a constitution in which auxiliary weighting coefficient for the vehicle speed difference a4 is set to a larger value when vehicle speed difference Vd is larger, the degree of influence of vehicle speed instruction value for controlling curve deceleration Vcop on target vehicle speed Vt can be reduced. As a result, the greater the vehicle speed difference Vd, the lower the deceleration of vehicle speed V so that it is possible to appropriately alleviate the driver's feeling that he is lagging behind.

In the second embodiment, the constitution is such that weighting coefficient a is set corresponding to distance to curve Lc. Also, in the third embodiment, the constitution is such that weighting coefficient a is set based on plural auxiliary weighting coefficients. However, the invention is not limited to these schemes. For example, one may also adopt a scheme in which weighting coefficient a in the second embodiment is replaced with the various auxiliary weighting coefficients in the third embodiment one at a time. That is, weighting coefficient a in the second embodiment may be substituted by auxiliary weighting coefficient a1 for vehicle 100, auxiliary weighting coefficient a2 for the radius of curvature or auxiliary weighting coefficient a4 for the vehicle speed difference. By means of such substitutions, the same operation and effects as those in the third embodiment can be realized. Also, auxiliary weighting coefficient for the distance to curve a3 is the same as weighting coefficient a in the second embodiment.

In the second and third embodiments, the constitution is such that weighting coefficient a keeps changing. However, the invention is not limited to this scheme. For example, one may also adopt a scheme in which weighting coefficient a is set once corresponding to the travel state of the preceding vehicle and vehicle 100 and the state of the curve ahead, or the value of weighting coefficient a is kept unchanged until the end of passing of through a curve. As a result, it is possible to reduce the computational load on cruise control 5 so that it is possible to suppress the cost increases that accompany increased computing ability of cruise control 5.

In the second and third embodiments, there are no particular restrictions on the variation of the value of weighting coefficient a. However, the variation may be restricted so that the change in weighting coefficient a does not exceed a prescribed value. That is, one may also adopt a scheme in which cruise control 5 has a constitution in which weighting coefficient a set during the last processing cycle and weighting coefficient a set during the during the current processing cycle are compared, and the value of weighting coefficient a set during the current cycle is corrected so that the change does not exceed a prescribed ratio. As a result, it is possible to suppress drastic changes in vehicle speed V, and it is possible to suppress feelings of discomfort of the passengers in the vehicle that accompany variations in vehicle speed V.

In the first through third embodiments, the value of weighting coefficient a is changed corresponding to vehicle speed V, radius of curvature Rc, distance to curve Lc and/or vehicle speed difference Vd. However, for example, one may also adopt a scheme in which the value of weighting coefficient a is changed corresponding to the target value of the inter-vehicle distance ("long," "intermediate," "short") due to the operation of ACC switch 1. In this case, the longer the target value of the inter-vehicle distance, the smaller the weighting coefficient a. A driver who has set a large inter-vehicle distance can be taken as an example of a driver who prefers a relatively large safety margin. Consequently, target vehicle speed Vt can be set to a value near vehicle speed instruction value for controlling curve deceleration Vcop, and the speed is set to a relatively large safety margin. On the other hand, a driver that sets a smaller inter-vehicle distance can be taken as an example of a driver who prefers more responsive driving. Consequently, it is possible to set target vehicle speed Vt to a value near inter-vehicle distance controlling vehicle speed instruction value Vacc, and the speed can be set so that the driver has greater ability to follow the preceding vehicle. Similarly, one may also adopt a scheme in which, based on the setting of the inter-vehicle distance control mode that can be set by operation of ACC switch 1, a smaller value for the weighting coefficient is set as the "normal mode," while a larger value of the weighting coefficient is set as the "sports mode."

Figure 12:
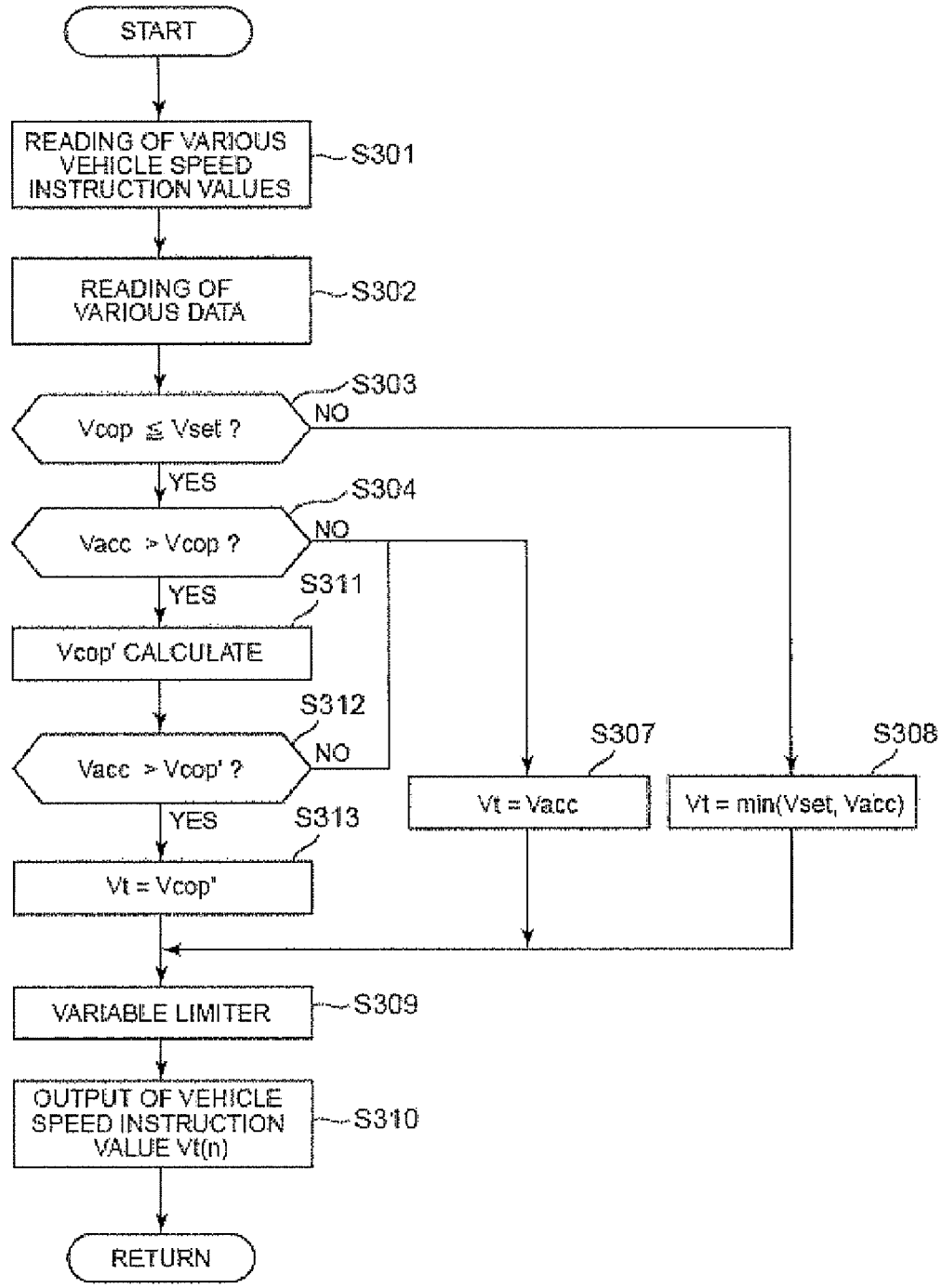
FIG. 12 is a flow chart illustrating processing for a vehicle speed instruction value for controlling curve deceleration in fourth and fifth embodiments.
Figure 13:
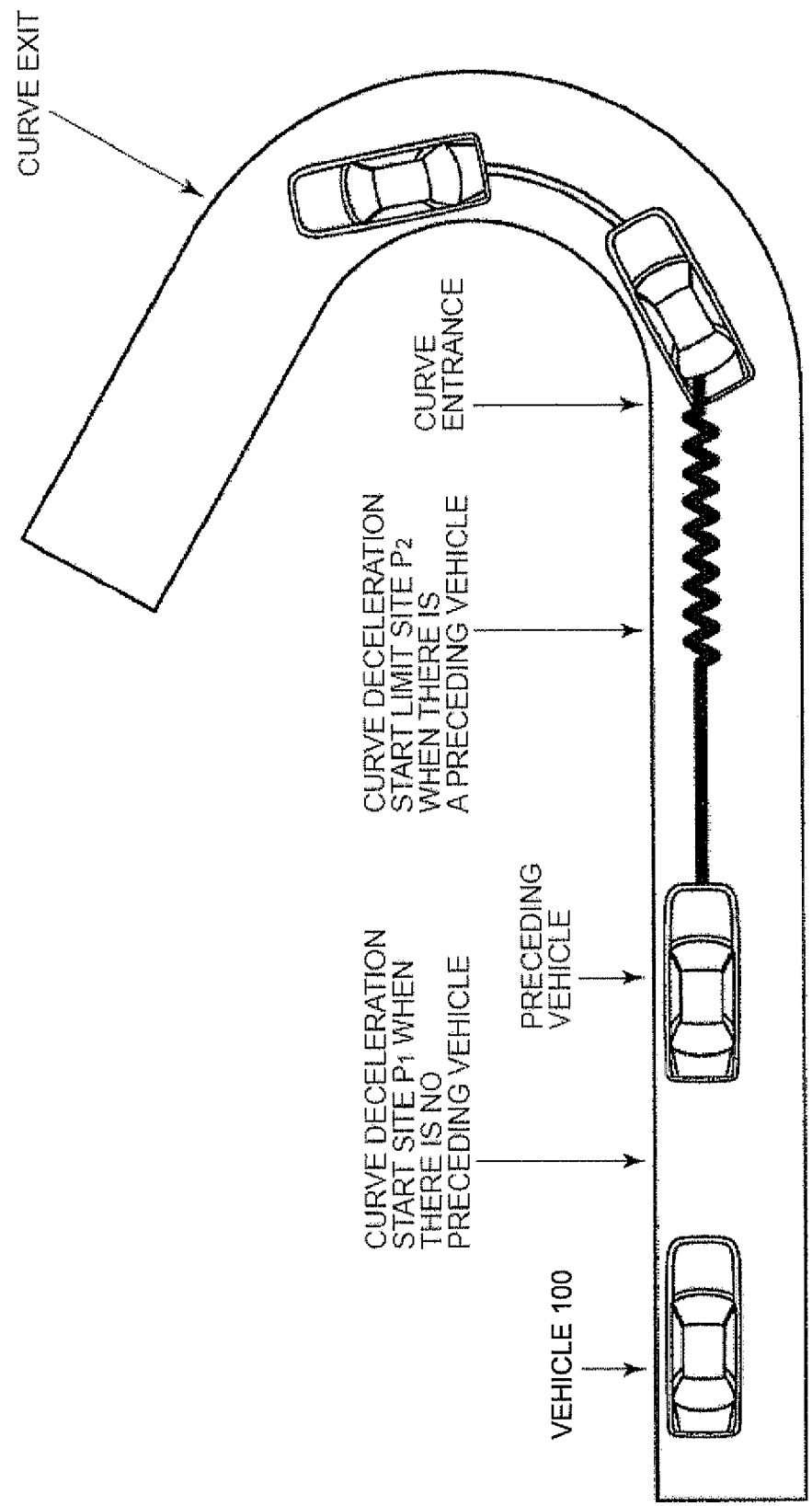
FIG. 13 is a schematic diagram illustrating the site where deceleration begins as a vehicle approaches a curve.

In the following, an explanation is given regarding the fourth embodiment of the present disclosure with reference to FIGS. 12-14. In the following explanation, the parts corresponding to the first through third embodiments are not repeated, and the explanation will mainly entail the points of difference. As shown in FIG. 12, for the vehicle cruise control in the fourth embodiment, instead of steps S305 and S306 shown in FIG. 7, steps S311-S313 are added. More specifically, prescribed deceleration G when vehicle speed instruction value for controlling curve deceleration Vcop is computed is changed so that Vcop' with a larger value than the conventional vehicle speed instruction value for controlling curve deceleration Vcop is computed, and the final target vehicle speed Vt is set.

In step S206 shown in FIG. 7, when vehicle speed instruction value for controlling curve deceleration Vcop is computed using formula (7), deceleration G has the value $G=G1_0$ since it is determined that there is no preceding vehicle based on inter-vehicle distance L read in step S201 in FIG. 6.

Also, when it is determined that there is a preceding vehicle based on inter-vehicle distance L read in step S201 shown in 7, corresponding to the setting state of the inter-vehicle distance set by the driver and read in step S201 shown in 7, deceleration G is set to the following values:

(1) When the setting state of the inter-vehicle distance is "short," $G=G1_1$;
(2) When the setting stage of the inter-vehicle distance is "intermediate," $G=(G1_0+G1_1)/2$; and
(3) When the setting stage of the inter-vehicle distance is "long," $G=G1_0$;

wherein $G1_1$ is equal to the maximum deceleration in control of the inter-vehicle distance; and
$G1_0$ has a value smaller than $G1_1$. For example, $G1_0$ is set to 1.0 m/s$^2$, and $G1_1$ is set to 2.5 m/s$^2$.

Also, when the setting distance of the inter-vehicle distance is "long," one may also set G to a value larger than that of $G1_0$ (e.g., $G1_0 \times 1.2$). One may set $G=(G1_0+G1_1)/2$ in "normal mode" and set $G=G1_1$ in "sports mode" based on the inter-vehicle distance control mode set by the operation of the driver on ACC switch 1. Also, one may also determine the setting value of deceleration based on a combination of the target inter-vehicle distance and the inter-vehicle distance control mode.

When vehicle 100 reaches the curve ahead, the vehicle speed V of vehicle 100 is controlled as follows.

When there is no preceding vehicle, inter-vehicle distance controlling vehicle speed instruction value Vacc computed in step S2 shown in FIG. 5 is used as the preset vehicle speed Vset. On the other hand, as can be seen from formulas (5)-(7), vehicle speed instruction value for controlling curve deceleration Vcop computed in step S3 is computed to correspond to the distance to the curve, and its value is smaller as the vehicle approaches the curve. Consequently, from the time that vehicle 100 passes a certain site, control is performed to decelerate vehicle 100 by means of the control of the vehicle speed on the curve so that vehicle speed instruction value for controlling curve deceleration Vcop becomes smaller than inter-vehicle distance controlling vehicle speed instruction value Vacc computed in step S2 (steps 4, 5).

On the other hand, when vehicle 100 follows the preceding vehicle and reaches a curve, as explained above, deceleration G is set to a value larger than that when there is no preceding vehicle when vehicle speed instruction value for controlling curve deceleration Vcop is computed using formula (7), and the new vehicle speed instruction value for controlling curve deceleration Vcop' is computed (step S311 shown in FIG. 12). Then, the smaller of inter-vehicle distance controlling vehicle speed instruction value Vacc and new vehicle speed instruction value for controlling curve deceleration Vcop' is set as target vehicle speed Vt (steps S312 and S313). Consequently, as shown in FIG. 13, the time at which the deceleration of vehicle 100 is begun with respect to the curve ahead becomes later than that if there were no preceding vehicle, and the position where vehicle 100 starts to decelerate is closer to the curve. That is, in this case vehicle 100 starts to decelerate at site P2, nearer to the curve than spot P1 where deceleration of vehicle 100 on the curve starts when there is no preceding vehicle.

Figure 14:
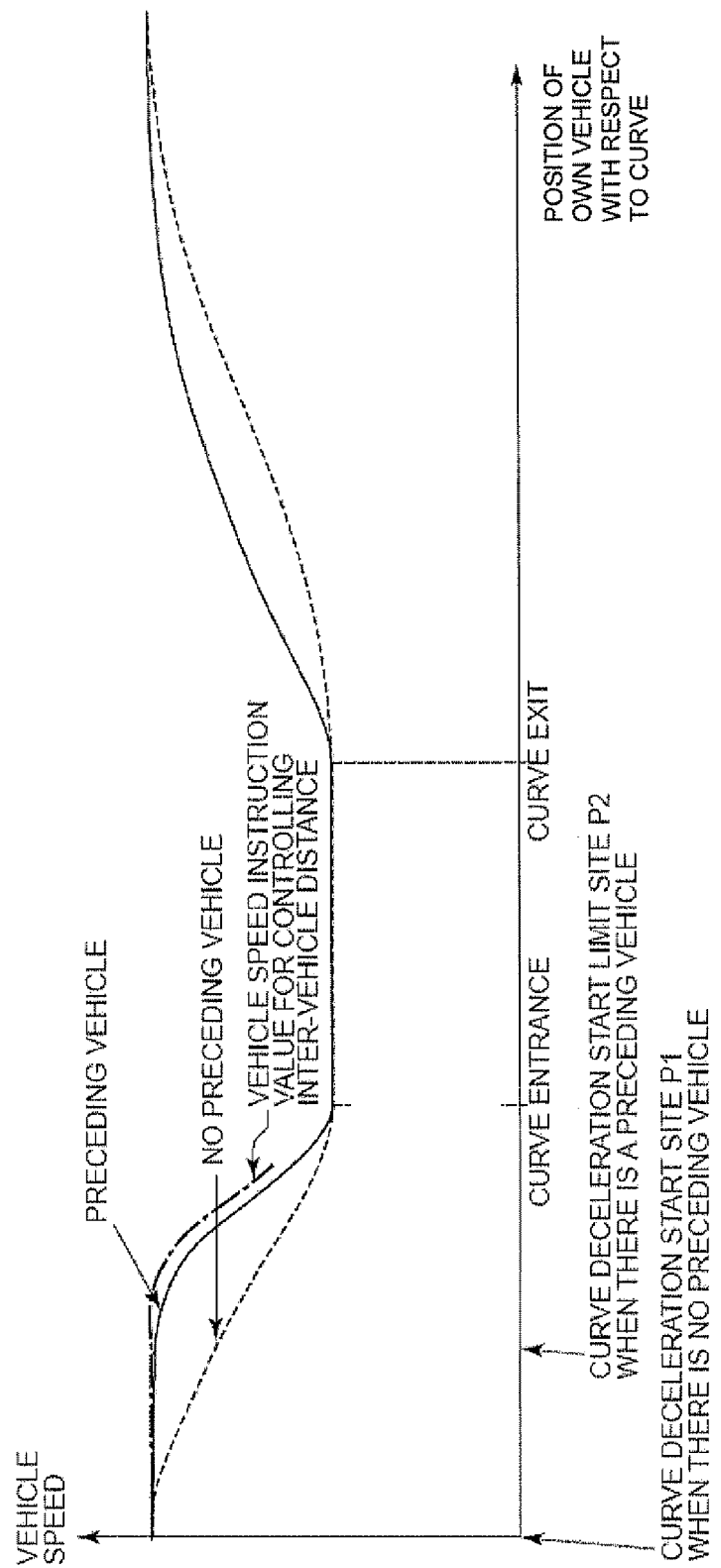
FIG. 14 is a graph illustrating the variation in the upper limit of the vehicle speed of a vehicle in the fourth embodiment.

FIG. 14 is a graph illustrating the state of change in vehicle speed V of vehicle 100 when there is a preceding vehicle and when there is no preceding vehicle. When there is no preceding vehicle, vehicle speed V is controlled to target vehicle speed Vt indicated by the broken line. In this case, vehicle 100 starts to decelerate at site P1 as explained above. When there is a preceding vehicle, vehicle speed V is controlled to target vehicle speed Vt indicated by the solid line. In this case, vehicle 100 does not begin to decelerate until it reaches site P2, and it starts its deceleration at site P2 with a greater deceleration than if there were a preceding vehicle. Also, the speed of vehicle 100 as it passes through the curve is the same regardless of the presence or absence of a preceding vehicle.

In regard to a vehicle with a conventional vehicle controller, even when there is a preceding vehicle, the own vehicle speed is controlled so that the vehicle speed becomes target vehicle speed Vt indicated by the broken line shown in FIG. 14. However, the deceleration is relatively low so that the deceleration control is started earlier than that of the preceding vehicle. The driver feels he is lagging behind the preceding vehicle (or driving too slow).

On the other hand, when there is a preceding vehicle and inter-vehicle distance controlling vehicle speed instruction value Vacc is larger than vehicle speed instruction value for controlling curve deceleration Vcop as explained above, vehicle 100 with a vehicle controller as taught herein sets deceleration G to a value larger than that in a conventional vehicle controller when vehicle speed instruction value for controlling curve deceleration Vcop is computed with formula (7). A new vehicle speed instruction value for controlling curve deceleration Vcop' is computed so that the time at which deceleration begins is closer to the curve. As a result, it is possible to alleviate the driver's feeling that he is lagging behind.

Also, the constitution is such that deceleration G can be changed corresponding to the inter-vehicle distance set by the driver or the control mode setting. As a result, corresponding to the inter-vehicle distance to the preceding vehicle after which vehicle 100 follows in a straight section of road before the curve, the time at which deceleration begins when vehicle 100 enters the curve is changed. It is possible to alleviate the driver's feeling that he is lagging behind the preceding vehicle.

Also, since the upper limit of deceleration G used to compute the new vehicle speed instruction value for controlling curve deceleration Vcop' is equal to the maximum deceleration in the control of the inter-vehicle distance, there is no significant variation in the deceleration behavior of vehicle 100 even when the state is switched from the state of following the decelerating preceding vehicle to the state of controlling the vehicle speed on the curve. That is, it is possible to have a steady variation in vehicle speed when switching from the state of following the decelerating preceding vehicle to the state of controlling the vehicle speed on the curve, and it is possible to alleviate the driver's feeling that he is lagging behind when switching from control based on inter-vehicle distance to control based on vehicle speed on the curve.

In the fourth embodiment, the upper limit value of deceleration G is changed when the new vehicle speed instruction value for controlling curve deceleration Vcop' is computed. In a fifth embodiment, however, the constitution is such that lateral acceleration Yg shown in formula (5) is changed. That is, when turning vehicle speed at each node point V(n) is computed using formula (5), if there is a preceding vehicle, lateral acceleration Yg is set to a higher value than that when there is no preceding vehicle. In addition, lateral acceleration Yg is changed corresponding to the inter-vehicle distance set by the driver or the inter-vehicle distance control mode setting. More specifically, lateral acceleration Yg is changed as follows:

(1) When there is no preceding vehicle, Yg=0.4 g;

(2) When the setting for the inter-vehicle distance is "short," Yg=0.45 g;

(3) When the setting for the inter-vehicle distance is "intermediate," Yg=0.43 g; and (4) When the setting for the inter-vehicle distance is "long," Yg=0.42 g.

As a result, turning vehicle speed at each node point V(n) computed using formula (5) becomes higher compared with the case when there is no preceding vehicle. Even when there is no change in deceleration G, vehicle speed instruction value for controlling curve deceleration Vcop computed using formula (7) still becomes larger. As a result, the time at which deceleration starts with respect to the curve ahead of vehicle 100 is later, and vehicle 100 starts its deceleration closer to the curve.

Figure 15:
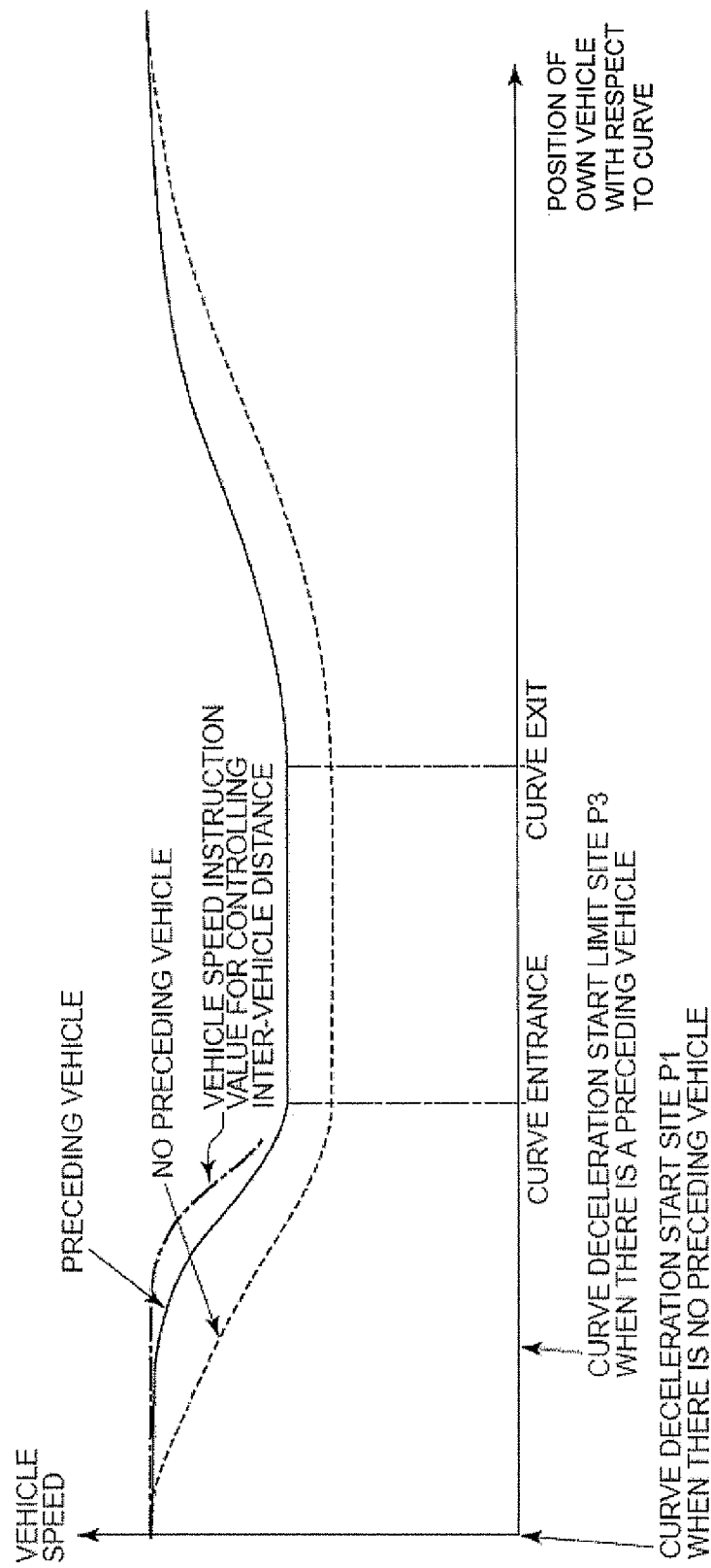
FIG. 15 is a graph illustrating the variation in the upper limit of the vehicle speed of a vehicle in the fifth embodiment.

FIG. 15 is a graph illustrating the variation in the upper limit of vehicle speed V of vehicle 100 when the constitution is such that lateral acceleration Yg is changed. When there is no preceding vehicle, vehicle speed V is controlled to target vehicle speed Vt indicated by the broken line. In this case, vehicle 100 starts to decelerate at site P1. In this way, this graph is similar to the graph described in FIG. 14 above. When there is a preceding vehicle, vehicle speed V is controlled so that it equals target vehicle speed Vt as indicated by the solid line. In this case, vehicle 100 does not decelerate until it reaches site P3, and it starts its deceleration at site P3 with the same deceleration as if there were no preceding vehicle. Also, the speed with which vehicle 100 passes through the curve is higher than that when there is no preceding vehicle. In this way, when the constitution is such that when there is a preceding vehicle, lateral acceleration Yg is greater than that when there is no preceding vehicle. It is possible to reduce the degree of reduction of the speed by means of the curve speed control, and the time at which deceleration begins is shifted to when the vehicle is closer to the curve. As a result, the same operation and effects as those described above can be realized.

As in fourth embodiment, in this embodiment one may also either change lateral acceleration Yg based on the inter-vehicle distance control mode or change lateral acceleration Yg based on a combination of the target inter-vehicle distance and the inter-vehicle distance control mode.

In addition, the same operation and effects as described above can also be realized by a constitution in which both deceleration G and lateral acceleration Yg are changed based on the target inter-vehicle distance and/or the inter-vehicle distance control mode.

In this fifth embodiment, the speed with which vehicle 100 passes through the curve is increased, and the time at which deceleration begins is shifted to a time when the vehicle is nearer the curve by changing lateral acceleration Yg. However, the invention is not limited to this scheme. For example, one may also adopt a scheme in which lateral acceleration Yg does not change, and a prescribed speed is added to turning vehicle speed at each node point V(n) computed with formula (5) so as to increase the speed of vehicle 100 as it passes through the curve. Accordingly, the time at which deceleration starts is shifted to a time when the vehicle is nearer the curve. As a result, the same operation and effects as described above can be displayed.

Also, when a prescribed speed is added to turning vehicle speed at each node point V(n) computed with formula (5), one may also adopt a scheme in which deceleration G is changed.

In the fourth and fifth embodiments, one may also adopt a scheme in which the upper limit value of deceleration G and lateral acceleration Yg are changed corresponding to vehicle speed V, radius of curvature Rc, distance to curve Lc and/or vehicle speed difference Vd.

Additional embodiment variants are next discussed.

Figure 16:
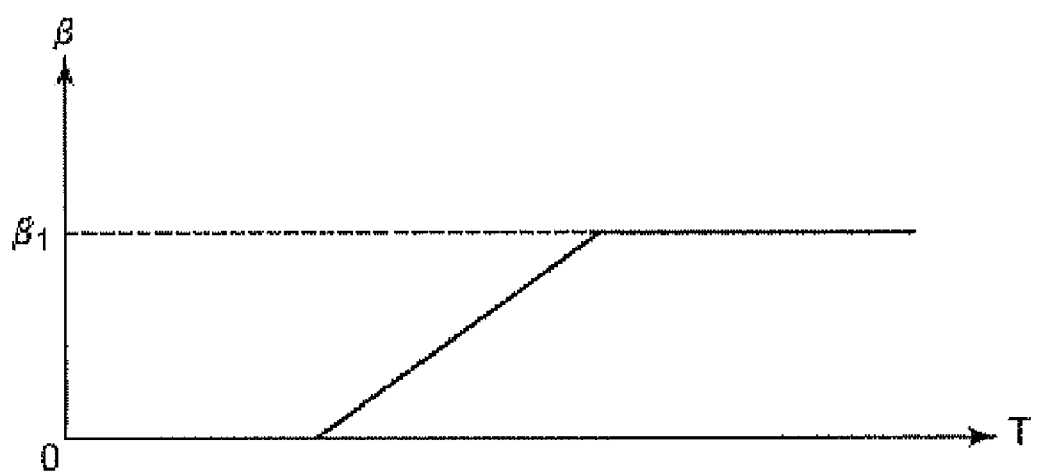
FIG. 16 is a graph illustrating the relationship between predicted deceleration start time Ta and acceleration limit value β.

In the first through fifth embodiments, limit value β of target vehicle speed Vt may be changed based on predicted deceleration start time Ta as shown in FIG. 16. More specifically, in step S309 shown in FIGS. 8 and 12, acceleration limit value β is used. In the following, an explanation is given in more detail regarding the method for setting acceleration limit value β.

In step S309 shown in FIGS. 8 and 12, acceleration limit value β is set as follows:

(1) When there is no preceding vehicle, β=β0; and (2) When there is a preceding vehicle, β=β1; wherein β1 is equal to the maximum acceleration in the inter-vehicle distance control; and β0 has a value smaller than β1. For example, β0 is set to 0.4 m/s², and β1 is set to 0.6 m/s².

As shown in FIG. 16, by setting β to 0 when predicted deceleration start time Ta is short, there is no increase in target vehicle speed Vt. Also as shown in FIG. 16, β gradually increases as predicted deceleration start time Ta increases. The upper limit of acceleration limit β is β1.

Predicted deceleration start time Ta is the time when vehicle 100 reaches the position where vehicle speed instruction value for controlling curve deceleration Vcop (or Vcop') will be lower than vehicle speed V as vehicle 100 travels at current vehicle speed V. When vehicle speed instruction value for controlling curve deceleration Vcop (or Vcop') is preset, it is possible to compute distance La between the current position of vehicle 100 and the position where vehicle speed instruction value for controlling curve deceleration Vcop (or Vcop') is lower than vehicle speed V. Predicted deceleration start time Ta is represented by the following formula:

$$Ta=La/V. \quad (10)$$

With this constitution, it is possible to prevent the following unnecessary variation in vehicle speed when the preceding vehicle accelerates immediately before the curve. That is, although deceleration by means of the curve speed control will start soon, vehicle 100 still accelerates for a short time and then decelerates. As a result, there is no variation in the acceleration/deceleration within a short period of time, and it is possible to prevent the discomfort to the driver that is caused by variation in the acceleration/deceleration.

In this embodiment variant, the constitution is such that acceleration limit value β is changed to correspond to predicted deceleration start time Ta. However, one may also adopt a constitution in which acceleration limit β is changed to correspond to distance La.

These embodiments and their variants may be implemented singly or in combination.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretations as to encompass all such modifications and equivalent structure as is permitted under the law.

What is claimed is:

1. A cruise control for a controlled vehicle that is following a preceding vehicle, the controlled vehicle including a preceding vehicle detector that detects an inter-vehicle distance to the preceding vehicle and a curve detector that detects curve information of a curve ahead of the controlled vehicle, the cruise control comprising:

a first speed instruction value computing part embedded in a microcomputer and configured to compute a first speed instruction value based on the inter-vehicle distance, the first speed instruction value corresponding to one of a speed or acceleration for regulating the inter-vehicle distance;

a second speed instruction value computing part embedded in the microcomputer and configured to compute a second speed instruction value for traveling on the curve based on the curve information, the second speed instruction value corresponding to one of a speed or acceleration for travelling along the curve;

a target speed setting part embedded in the microcomputer and configured to set a final target speed higher than the second speed instruction value and lower than the first speed instruction value when the controlled vehicle travels on the curve and while the first speed instruction value is larger than the second speed instruction value; and a speed control part embedded in the microcomputer and configured to control a speed of the controlled vehicle based on the final target speed.

2. The cruise control according to claim 1 wherein the target speed setting part is configured to compute the final target speed based on at least one of the inter-vehicle distance, a current speed of the controlled vehicle and the curve information.

3. The cruise control according to claim 1, further comprising:
- a setting device configured to allow a driver to set at least one of a target inter-vehicle distance and a control mode for the inter-vehicle distance; and
- wherein the target speed setting part is configured to compute the final target-speed based on a setting of the setting device.

4. The cruise control according to claim 1 wherein the target speed setting part is configured to compute the final target speed based on the first speed instruction value, the second speed instruction value and weighting coefficients for the first and the second vehicle speed instruction values.

5. The cruise control according to claim 4 wherein the target speed setting part is configured to change the weighting coefficients based on at least one of the inter-vehicle distance, a current speed of the controlled vehicle and the curve information.

6. The cruise control according to claim 4, further comprising:
- a setting device configured to allow a driver to set at least one of a target inter-vehicle distance and a control mode for the inter-vehicle distance; and
- wherein the target speed setting part is configured to change the weighting coefficients based on a setting of the setting device.

7. The cruise control according to claim 4 wherein the target speed setting part is configured to maintain the weighting coefficients at values based on the setting of the setting device until the vehicle passes the curve.

8. The cruise control according claim 1 wherein the second speed instruction value computing part is configured to preset the second speed instruction value ahead of the curve and to gradually lower the second speed instruction value by a first deceleration until a target turning speed is reached; and
- wherein the target speed setting part is configured to set the final target speed by correcting at least one of the first deceleration and the target turning speed to a higher value.

9. The cruise control according to claim 8 wherein the target speed setting device changes the at least one of the first deceleration and the target turning-speed based on at least one of the inter-vehicle distance, a current speed of the controlled vehicle and the curve information.

10. The cruise control according to claim 8, further comprising:
- a setting device configured to allow a driver to set at least one of a target inter-vehicle distance and a control mode for the inter-vehicle distance; and
- wherein the target speed setting part is further configured to change at least one of the first deceleration and the target turning speed based on a setting of the setting device.

11. The cruise control according to claim 8 wherein the first speed instruction value computing part is configured to limit a variation in the first speed instruction value such that the first speed instruction value does not exceed a second deceleration higher than the first deceleration; and
- wherein the target speed setting part is configured to correct the first deceleration to the second deceleration.

12. The cruise control according to claim 1,
- wherein at least one of a time and a distance is computed until the second speed instruction value is reduced and deceleration with respect to the curve begins; and
- wherein the target speed setting part is configured to set an acceleration limit value to make it more difficult to accelerate to the final target speed when the time or the distance becomes shorter.

13. A cruise control for a controlled vehicle that is following a preceding vehicle, the controlled vehicle including a preceding vehicle detector that detects an inter-vehicle distance to the preceding vehicle and a curve detector that detects curve information of a curve ahead of the controlled vehicle, the cruise control comprising:
- first computing means for computing a first speed instruction value based on the inter-vehicle distance, the first speed instruction value corresponding to one of a speed or acceleration for regulating the inter-vehicle distance; and the first computing means embedded in a microcomputer;
- second computing means for computing a second speed instruction value for traveling on the curve, the second speed instruction value based on the curve information, the second speed instruction value corresponding to one of a speed or acceleration for travelling along the curve; and the second computing means embedded in the microcomputer;
- target setting means for setting a final target speed higher than the second speed instruction value and lower than the first speed instruction value when the vehicle travels over the curve and while the first speed instruction value is larger than the second speed instruction value; and the target setting means embedded in the microcomputer;
- speed controlling means for controlling a speed of the controlled vehicle based on the final target vehicle speed, the speed controlling means embedded in the microcomputer.

14. A cruise control method for a controlled vehicle following a preceding vehicle, the controlled vehicle including a preceding vehicle detector that detects an inter-vehicle distance to a preceding vehicle and a curve detector that detects curve information of a curve ahead of the controlled vehicle, the method comprising:
- setting a first speed instruction value based on the inter-vehicle distance, using a first speed instruction value computing part embedded in a microcomputer; the first speed instruction value corresponding to one of a speed or acceleration for regulating the inter-vehicle distance;
- setting a second speed instruction value for traveling on the curve based on the curve information, using a second speed instruction value computing part embedded in the microcomputer; the second speed instruction value corresponding to one of a speed or acceleration for travelling along the curve; using a target speed part embedded in the microcomputer;
- using a target speed setting part embedded in the microcomputer, setting a final target speed as a vehicle speed higher than the second speed instruction value and lower than the first speed instruction value for at least a portion of the curve when the controlled vehicle travels on the curve and while the first speed instruction value is larger than the second speed instruction value and controlling a speed of the controlled vehicle based on the final target speed using a speed control part embedded in the microcomputer.

15. The cruise control method according to claim 14 wherein setting the final target speed further comprises:
- computing the final target speed based on at least one of the inter-vehicle distance, a current speed of the controlled vehicle and the curve information.

16. The cruise control method according to claim 14, further comprising:
- setting at least one of a target inter-vehicle distance and a control mode for the inter-vehicle distance; and wherein setting the final target speed further includes:

computing the final target speed based on the target inter-vehicle distance or the control mode.

17. The cruise control method according to claim 14, further comprising:
computing at least one of a time and a distance until the second speed instruction value is reduced and deceleration with respect to the curve begins; and wherein setting the final target speed further comprises:
setting an acceleration limit value making it more difficult to accelerate to the final target speed when the time or the distance becomes shorter.

18. The cruise control method according to claim 14 wherein setting the final target speed further comprises:
computing the final target speed based on the first speed instruction value, the second speed instruction value and a weighting coefficient for the first and the second speed instruction values.

19. The cruise control method according to claim 18, further comprising:
changing the weighting coefficient based on at least one of the inter-vehicle distance, a current speed of the controlled vehicle and the curve information.

20. The cruise control method according claim 14, further comprising:
setting the second speed instruction value ahead of the curve;
gradually lowering the second speed instruction value by a first deceleration until a target turning speed is reached; and
correcting at least one of the first deceleration and the target turning speed to a higher value; and wherein setting the final target speed further includes setting the higher value as the final target speed.

* * * * *